United States Patent [19]

Tsuzuki et al.

[11] Patent Number: 4,465,999

[45] Date of Patent: Aug. 14, 1984

[54] MATRIX DRIVING METHOD FOR ELECTRO-OPTICAL DISPLAY DEVICE

[75] Inventors: Akira Tsuzuki, Tokyo; Hiro Fujita, Sayama; Shigeru Morokawa, Higashiyamato, all of Japan

[73] Assignee: Citizen Watch Company Limited, Tokyo, Japan

[21] Appl. No.: 99,805

[22] Filed: Dec. 3, 1979

Related U.S. Application Data

[63] Continuation-in-part of Ser. No. 805,061, Jun. 9, 1977, abandoned.

[30] Foreign Application Priority Data

Jun. 15, 1976 [JP] Japan .................................. 51-69363
Jul. 22, 1976 [JP] Japan .................................. 51-87676
Feb. 18, 1977 [JP] Japan .................................. 52-16824
Feb. 18, 1977 [JP] Japan .................................. 52-16825
Apr. 30, 1977 [JP] Japan .................................. 52-50583

[51] Int. Cl.³ ............................................. G09G 3/36
[52] U.S. Cl. ..................................... 340/784; 340/756; 340/805; 340/754
[58] Field of Search ............... 340/805, 784, 765, 752, 340/756, 753, 754; 350/330-333

[56] References Cited

U.S. PATENT DOCUMENTS

| | | | |
|---|---|---|---|
| 3,911,421 | 10/1975 | Alt et al. | 340/784 |
| 3,973,252 | 8/1976 | Mitomo et al. | 340/784 |
| 3,976,362 | 8/1976 | Kawakami | 340/784 |
| 4,048,633 | 9/1977 | Sano | 340/784 |
| 4,082,430 | 4/1978 | Schulthess et al. | 340/784 |
| 4,127,848 | 11/1978 | Shanks | 340/784 |

*Primary Examiner*—Marshall M. Curtis
*Attorney, Agent, or Firm*—Jordan and Hamburg

[57] ABSTRACT

A method of cyclically driving an electro-optical display device having a matrix array of a plurality of row electrodes and a plurality of column electrodes, wherein said column electrodes intersect with said row electrodes to provide a plurality of display elements at intersections between said row and column electrodes, comprising the steps of: applying row drive signals to said row electrodes, respectively; and applying one of first, second and third column drive signals to each of said column electrodes, with said first column drive signal inducing a non-display state at all of the display elements along each column electrode, said second column drive signal inducing a non-display state at a single display element along said each column electrode and inducing a display state at the other two display elements along said each column electrode, and said third column drive signal inducing a display state at all of the display elements along said each column electrode; wherein each of said row drive signals takes a plurality of voltage potentials during a half cycle period divided into prescribed time intervals and one of said row drive signals takes one of said voltage potentials different from those of the other of said row drive signals during each of said prescribed time intervals; and wherein said first column drive signal takes a reference voltage potential equal to the mean value of said voltage potentials of said row drive signals during said prescribed time intervals of said half cycle period, said second column drive signal takes a first voltage potential different from those of said row drive signals during one of said prescribed time interval, said reference voltage potential during another one of said prescribed time intervals, and a second voltage potential different from those of said row drive signals during another one of said prescribed time intervals, and said third column drive signal takes the first and second voltage potentials during each of said prescribed time intervals.

5 Claims, 54 Drawing Figures

Fig. 3A
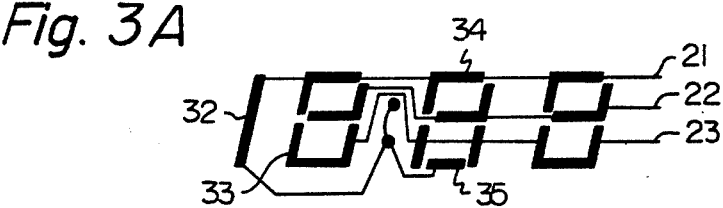
Fig. 3B
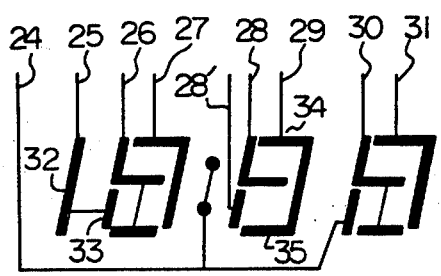
Fig. 3C
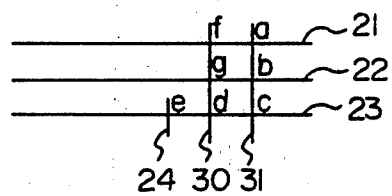
Fig. 3D
|   | 0 | 1 | 2 | 3 | 4 | 5 | 6 | 7 | 8 | 9 |
|---|---|---|---|---|---|---|---|---|---|---|
| a | ⊙ | × | ○ | ○ | × | ○ | ○ | ○ | ○ | ○ |
| b | ○ | ○ | ○ | ○ | ○ | × | × | ○ | ○ | ○ |
| c | ○ | ○ | × | ○ | ○ | ○ | ○ | ○ | ○ | ○ |
| d | ○ | × | ○ | ○ | × | ○ | ○ | × | ○ | ○ |
| e | ○ | × | ○ | × | × | × | ○ | × | ○ | × |
| f | ○ | × | × | × | ○ | ○ | ○ | × | ○ | ○ |
| g | × | × | ○ | ○ | ○ | ○ | ○ | × | ○ | ○ |

Fig. 28
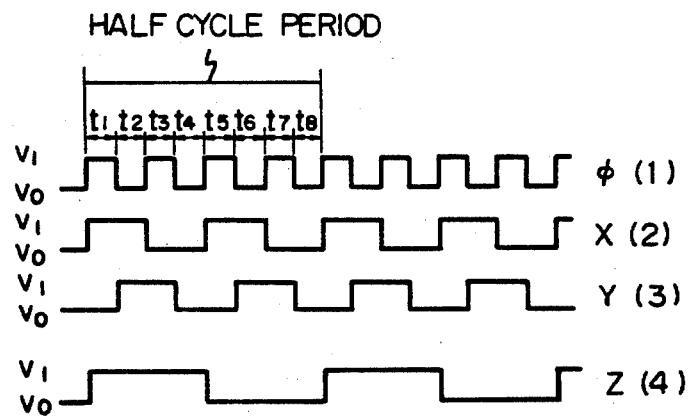
Fig. 29
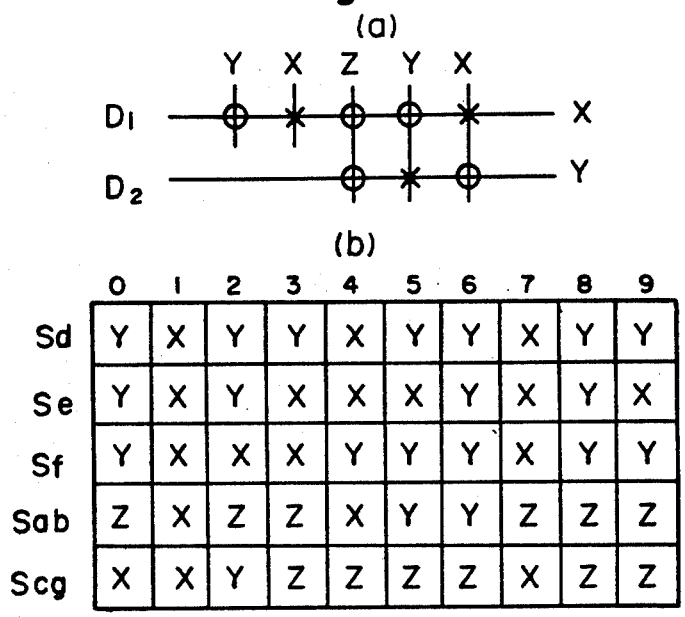
Fig. 30
0 123456789

MATRIX DRIVING METHOD FOR ELECTRO-OPTICAL DISPLAY DEVICE

This is a continuation in part of U.S. patent application Ser. No. 805,061, filed June 9, 1977 and now abandoned.

This invention relates to a driving method for an electro-optical display device, and more particularly relates to a driving method for a display device the electrodes of which are connected in a matrix configuration.

In a matrix driving system, display elements are arrayed in n-rows and q-columns, with periodic row drive signals r being applied to the row electrodes and column drive signals C of the same period being applied to the column electrodes. In such a case, a voltage having an rms value given by $$V = \sqrt{\frac{1}{T} \int^T (r - c)^2 dt}$$

is applied to display elements at intersections between the row and column electrodes, where T represents the period or frame time of the drive signals. According to the pattern which is desired to be displayed, there are applied drive signals r and C the waveforms of which impress a high rms voltage upon certain display elements (so that the elements are in an ON state) while the other display elements are impressed with a low rms voltage (so that these elements are in the OFF state). At this time, letting Von represent the minimum rms voltage impressed upon the elements in the ON state and Voff the maximum rms voltage impressed upon the elements in the OFF state, the ratio $\alpha =$ Von/Voff is referred to as the operation margin. Although the absolute values of Von, Voff change depending upon the power source voltage, the operation margin is a constant determined by the driving system and serves as a standard by which the quality of the driving system can be decided.

Since the variation in the optical characteristics of twist-type nematic liquid crystals are further gentle with respect to voltage variations, good contrast cannot be obtained unless the driving system has an operation margin at least of the order of 1.7 or 2. In particular, an operation margin slightly higher than these values is preferable for display devices of the reflective type if they are to present an attractive display and resist fluctuations in power source voltage over a wide temperature range as is desirable in the case where display devices are applied to electronic timepieces.

In a conventional driving system, the row drive signals have given waveforms which are unrelated to the display pattern and symmetrical with respect to each other. Drive signals capable of displaying any of the $2^n$ patterns can be applied to row and column electrodes. Therefore, the operation margin is small or, by way of example, $$\alpha = \sqrt{(n + 3)/(n - 1)}$$

for ⅓ biasing using two power sources with three potential levels, and $$\alpha = \sqrt{(n + 8)/n}$$

for ¼ biasing using four power sources with four potential levels. Accordingly, it is very difficult to drive a matrix having four or more rows.

There are many instances in which there is, to a certain extent, a relation between the display elements to be turned OFF and the display elements to be turned ON for the display of practical numbers, characters, and graphs and for animation, and if the display elements are suitably connected, it is unnecessary to provide drive signals corresponding to all $2^n$ patterns of $2^n$. On the other hand, there are included among the $2^n$ patterns certain first patterns that are easy to drive, i.e., those for which a large operation margin can be easily obtained, and second patterns that are difficult to drive, i.e., those patterns which offer difficulty when trying to increase the operation margin. The second patterns will be referred to as the worst patterns hereinafter. The operation margin is actually decided by specific combinations of display patterns along several columns. Since the conventional driving methods adopt drive signals having waveforms which correspond to all patterns that include the worst patterns of the above-mentioned type, the operation margin is limited to a low value.

It is, therefore, an object of the present invention to provide an arrangement of display element connections which will not give rise to the worst patterns or which will generate only pattern combinations that are easy to drive, and, in adopting a driving system suited to patterns which are intended to be displayed, to apply row and column electrodes with drive signals that make it possible to obtain a large operation margin or to reduce the number of power sources. An attractive display with good contrast is thus capable of being readily achieved and can be effectively utilized in display devices which make use of reflective twist-type nematic liquid crystals for timepieces, electronic calculators and the like.

In the accompanying drawings, in which:

FIGS. 3A and 3B show an example of electrode arrangement of an electro-optical display device to which a first preferred driving method of the present invention is applied;

FIG. 3C is a symbolic representation of the electrode arrangement shown in FIGS. 3A and 3B;

FIG. 3D is a diagram showing the relationship between the display elements and the displayed contents;

FIG. 28 and FIG. 28A are waveform diagrams for drive signals to be used for the electrode arrangement shown in FIG. 26;

FIG. 29 shows a mode of application of signals to column electrodes depending upon whether they are to be brought to a state of display or non-display for a case in which the electrodes are divided as shown in FIG. 26;

FIG. 30 shows numbers from 0 to 9 formed by seven segments;

Figure 1:
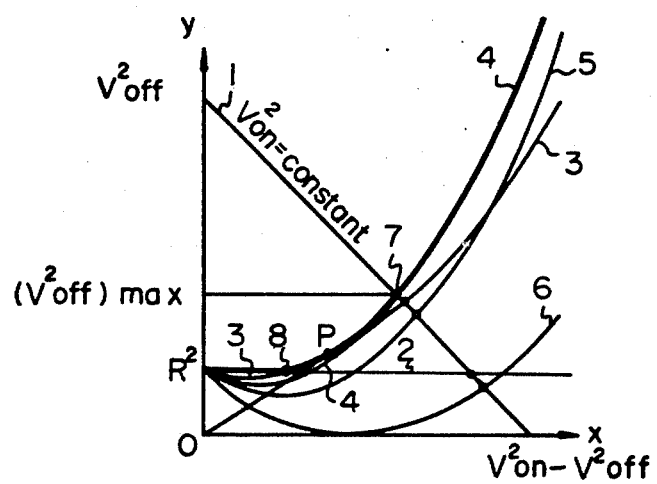
FIG. 1 is a graph showing the relation between Von and Voff which vary as parameters of the number of ON display elements and OFF display elements along a given column.

It will be useful for the following description to utilize vector representation for the drive signal waveforms. One period or frame time of the drive signal waveform will be divided into several intervals t1, t2 . . . tj, and the drive signal will possess fixed potential level over the whole of each representative interval. If T denotes the time for one period li the potential of the drive signal over the i-th interval and ti the duration of the i-th interval, $li\sqrt{ti/T}$ defines the i-th component of the j-dimension vector e, and the drive signal waveform E and the point e expressed in terms of j-dimension rectangular coordinates correspond. n signal waveforms A1, A2 . . . An are similarly divided into intervals and expressed as a1, a2 . . . an for the corresponding vectors. The distance between vector ak and al is equal to the rms value of the potential difference between signal waveforms ak and al. Further, signal waveforms A1, A2 . . . An may be transformed into vectors a1', a2' . . . an' by a different method of dividing them into intervals. Vectors a1, a2 . . . an and a1', a2' . . . an' are then in congruence. In other words, it is possible to bring them into coincidence by rotational movement, parallel movement and a reversal transformation. The transformation from vectors to signal waveforms may be carried out by a procedure which is the reverse of that stated above. When vectors a1, a2 . . . an are transformed into signal waveforms they can also be transformed into A1', A2' . . . An' in addition to A1, A2 . . . An. However, the set of converted signal waveforms A1, A2 . . . An obtained from vectors a1, a2 . . . an and vectors a1', a2' . . . an' obtained from their rotational movement, parallel movement and reversal transformation, when considered from the aspect of the rms voltage applied to the display elements, constitute a single group having exactly the same properties.

Next, the meaning of the "worst" pattern will be explained. When the row drive signals r1, r2 . . . rn satisfy the following conditions, they will be said to possess symmetry. If $r_o$ is taken as the mean value for each instant of the drive signal potentials of all the rows, then, with respect to one period T of the drive signal, $$\frac{1}{T} \int^T (ri - r_o)^2 dt$$

is equal to the given value $R^2$ irrespective of i, and $$\frac{1}{T} \int^T (ri - r_o)(rj - r_o) dt$$

is equal to the given value $-R^2/(n-1)$ irrespective of i, j when i and j are unequal. If these conditions are expressed in terms of vectors, r1, r2 . . . rn lie on the surface of an $(n-1)$-dimensional hypersphere of radius R having the point $r_o$ as its center, and when n is equal to or greater than 3, any three points ri, rj, rk define an equilateral triangle having squared sides of $2nR^2/(n-1)$. C will be taken as the column drive signal of a column which turns ON the display element of m rows from among the n rows and turns OFF (n−m)

rows. The sum of the squares of the voltages applied to display elements in the OFF state, namely $$S_{off} = \int^T \sum_i (ri - C)^2 dt/T$$

can be expressed as $$S_{off} = \int^T \sum_i (ri - \overline{r_{off}})^2 dt/T + (n-m) \int^T (\overline{r_{off}} - C)^2 dt/T$$

using the mean value $\overline{r_{off}}$ of the OFF row signal. The sum of the squares of the voltages applied to display elements in the ON state, namely $$S_{on} = \int^T \sum_j^{E_{on}} (rj - C)^2 dt/T$$

is expressed as $$S_{on} = \int^T \sum_j^{E_{on}} (rj - \overline{r_{on}})^2 dt/T + m \int^T (\overline{r_{on}} - C)^2 dt/T$$

using the mean value $\overline{r_{on}}$ of the ON row signals. With $S_{off}$ held constant, $S_{on}$ may be maximized by taking C as lying on the extended line $r_{on}$, $r_{off}$ as represented in terms of vectors. Using a positive coefficient A, the expression $$C = r_0 - A \sum_j^{E_{on}} (rj - r_0) \text{ (where } \sum_j^{E_{on}}$$

represents the sum of the ON rows) is the most favorable. If this is taken to be the case, the $V_{on}$ and $V_{off}$ voltages applied to the ON and OFF display elements when the row drive signal possesses symmetry are then given by $$V_{on}^2 = \{n-1+2(n-m)A+m(n-m)A^2\} \cdot R^2/(n-1) \quad (1),$$

$$V_{off}^2 = \{n-1-2mA+m(n-m)A^2\} \cdot R^2/(n-1) \quad (2),$$

$$V_{on}^2 - V_{off}^2 = 2nAR^2/(n-1) \quad (3).$$

The number of k ON display elements number in the worst pattern and the most suitable value of A under these conditions are determined from these equations. The procedure is: (a) provisionally deciding the value of $V_{on}^2$; (b) obtaining the value of A corresponding to $V_{on}^2$ with regard to each m from 0 to $(n-1)$; and (c) obtaining $V_{off}^2$ corresponding to the same A with regard to m from 0 to $(n-1)$, with the maximum value of $V_{off}^2$ including m=0 being given as $(V_{off}^2)$max. In accordance with this procedure, $(V_{off}^2)$max is obtained as a function of $V_{on}^2$, $V_{on}^2$ is determined so as to maximize the operation margin, and m which decides $(V_{off}^2)$max becomes the ON display element number k of the worst pattern. Although this is obtained also by calculation, the general idea will be clear from FIG. 1.

FIG. 1 illustrates the relation among the above-mentioned equations with $V_{on}^2 - V_{off}^2$ taken along the horizontal axis, $V_{off}^2$ taken along the vertical axis for fixed n and with m as a parameter. The relationship between the line 2 and parabolas 3, 4, 5 and 6 and the value of M is given by the following table:

| Curve | M |
|---|---|
| 2 | 0 |
| 3 | 1 |
| 4 | 2 |
| 5 | 3 |
| 6 | 4 |

The line 2 and parabolas 3, 4, 5 and 6 pass through the point O, $R^2$. The constant $V_{on}^2$ relation is represented by line 1 having a slope of $-1$, the value of $V_{off}^2$ from procedure (c) is represented by the points of intersection between line 1, and line 2 and parabolas 3, 4, 5 and 6, with $(V_{off}^2)$max being located at point 7 which is the uppermost intersection lying furthest to the left. When $V_{on}^2$ is changed, the point representing $(V_{off}^2)$max moves along curve 8. For a large operation margin $\alpha$ a small value for $V_{off}^2/(V_{on}^2-V_{off}^2)$ is necessary; therefore, when the point P is placed on curve 8 it is best that the straight line connecting the origin O with the point P should touch the curve 8. This represents the limit which cannot be exceeded by the operation margin of a drive signal system capable of displaying a combination of all patterns. For $n \geq 3$, the inequality $$\frac{n^2 - n + 1 - \sqrt{n^3 - n + 1}}{2n} \leq k \leq \frac{n^2 + n - 1 - \sqrt{n^3 - n + 1}}{2n}$$

is satisfied by only one integer k=K and it can be understood that the straight line OP will then touch a parabola of an ON display element number of m=K. In this case the constant A and the operation margin $\alpha$ are given by $$A = \sqrt{(n-1)/\{K(n-K)\}} \text{ and } \alpha =$$

$$\sqrt{\frac{n - k + \sqrt{K(n-K)(n-1)}}{-K + \sqrt{K(n-k)(n-1)}}}.$$

When n=2, point P is the point of intersection of a straight line for m=0 and a parabola for m=1; thus, A=2 and $\alpha$=3.

In a conventional matrix driving method which makes it possible to combine all patterns, a practical method such as the conventional ⅓ or ¼ biasing does not always necessarily produce a column drive signal having an ideal value for A because of the restriction upon power source voltages and the number of power sources. Nevertheless, the operation margin is still restricted by the state which turns on k display elements among n rows.

For the worst pattern when $n \geq 3$, there simultaneously exist for all combinations column which turn on display elements on k rows from among the n rows and columns which turn off the display elements on (n−k) rows. For n=2, there simultaneously exist two types of column, i.e., columns which turn on one row and turn off one row, along with a column which turns off two rows.

Figure 2:
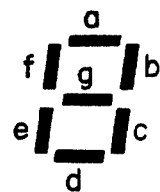
FIG. 2 shows an example of segment arrangement.

FIG. 2 shows an example of display elements which constitute a part of an electro-optical display device to which a method of the present invention is applied, and which are denoted by the alphabets a through g.

FIG. 3A shows an example of an electrode pattern for row electrodes 21 to 23, of a display device composed of a units of minutes digit, a tens of minutes digit, a units of hours digit and a tens of hours digit to provide a display of time information in an electronic timepiece and FIG. 3B shows an example of an electrode pattern for column electrodes 24 through 31 for the electrode pattern shown in FIG. 3A. FIG. 3C shows an example of a matrix arrangement illustrating the relationship between the row electrodes and the column electrodes of the units of minutes digit. As seen from FIG. 3C, the display elements or display segments a, b and c are provided at intersections of the row electrodes 21 to 23 across the column electrode 31. The display segments f, g and d are provided at intersections of the row electrodes 21 to 23 across the column electrode 30, and the display segment e is provided at an intersection of the row electrode 23 across the column electrode 24.

FIG. 3D is a diagram illustrating the relationship between the display segments a through g and the contents of the displayed digit, with the symbol "o" indicating the "turned on" state while the symbol "x" indicating the "turned off" state. As seen from FIG. 3D, there will never be a condition in which two of the display segments a, b and c or the display segments f, g and d are turned off at the same time. Namely, only three conditions exist in which all of the display segments a, b and c or f, g and d are turned on, all of the display segments a, b and c or f, g and d are turned off, and two of the display segments a, b and c or f, g and d are turned on and the remaining single display segment is turned off. This eliminates the worst display pattern. When n=3, the same graph as depicted in FIG. 1 is described. If this case is considered with the exception of the curve for m=1, the undesired pattern which restricts the operation maargin is subsequently found at the intersections of m=0 and m=2. In this case the ideal value for A is 2, and the limit of the operation margin is $\sqrt{7}$. A display element 32 exists at the intersection of column electrode 25 and row electrode 21, and a display element representative of an e-segment is located at the intersection of column electrode 25 and row electrode 23, with one of the elements being turned ON and the other OFF. However, as there is no intersection and hence no display element between column electrode 25 and row electrode 22 there is never a condition in which one row is turned ON and two rows are turned OFF; in other words, what has been referred to herein as the worst pattern does not occur. For example, when one of display elements 32 and 33 is turned ON, an ON drive signal may be supplied even with respect to row electrode 22, and an OFF drive signal may be applied to this electrode when display elements 32 and 33 are both simultaneously turned OFF. Further, although column electrode 29 possesses four display elements, element 34 representative of the a segment and element 35 representative of the d segment may be considered to be the same.

When the number of ON display elements m=2, there are cases in which a certain display element among display elements to be turned OFF simultaneously exists in three rows; hence, imparting the row drive signal with nonsymmetry will not be useful in effecting an improvement. If it is decided that the row drive signal is symmetrical, row drive signals r1, r2, r3 expressed in terms of vectors form the apices of an equilateral triangle lying on a circle having a radius of R. It is preferable that the column drive signal Co which turn display elements on all the rows OFF be located in the vicinity of the center of the triangle. R is taken as the distance separating the row drive signal r3 from the column drive signal C12 of the segments which turn the 1st and 2nd rows ON and the 3rd row OFF, and C12 is preferably chosen to lie at a point as far as possible from r1, r2. Since the column drive signal C123 which simultaneously turn on display elements on three rows may be separated from r1, r2, r3 by a distance of at least C12-r1, the limit of the operation margin can be increased to $\sqrt{7}$ for the ideal position shown in FIG. 3(a). In other words, r1, r2, r3 lie on a circle having a radius of R and a center of Co, and define an equilateral triangle, the three points C12, C13, C23 lie on a circle of radius 2R about the center Co and define an equilateral triangle, and the points (C13, r2, Co), (C23, r1, Co) and (C12, r3, Co) respectively, lie on straight lines.

Figure 4A:
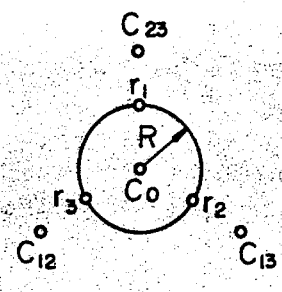
FIGS. 4A, 4B and 4C show vector diagrams for drive signals applied to the display device shown in FIG. 3.

The following rule, which will be explained at a later time, can now be expressed. Namely, r1, r2, r3 are the apices of an equilateral triangle having a center of Co, and the column drive signal Cab which turn display elements on rows a and b ON is located at a position obtained by extending, by twice the distance, the straight line connecting the mean value $r_{ab}$ of ra and rb and the mean value Co of r1, r2, r3. Further, although not expressed in the drawings, C123 is located on a line perpendicular to the plane of the paper and separated from Co by a distance of $\sqrt{6}R$. If the pattern of FIG. 4A is positioned in 3-dimensional space as shown in FIG. 4B, each of the points shown come into perfect coincidence with a point of the lattice, and it can be understood that driving can be accomplished by utilizing four power sources and five potential levels.

Figure 4B:
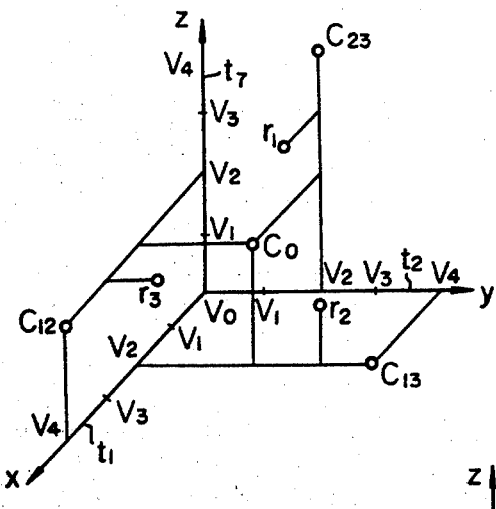
Figure 4C:
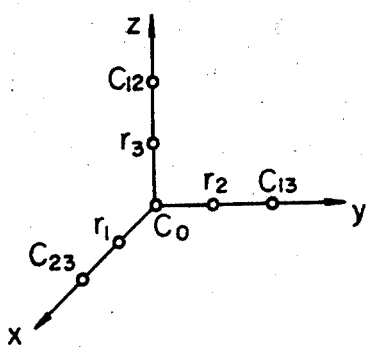
Figure 5A:
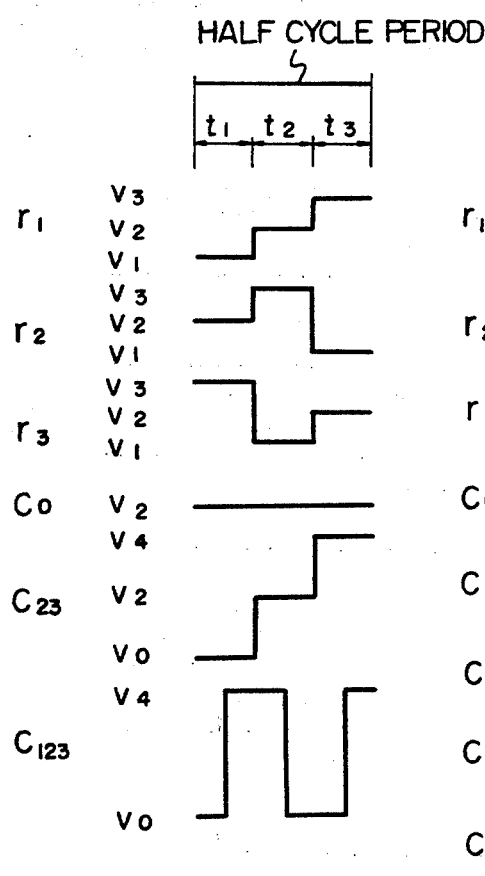
FIGS. 5A and 5B show example of waveforms of row and column drive signals for carrying out the first preferred driving method of the present invention.
Figure 5B:
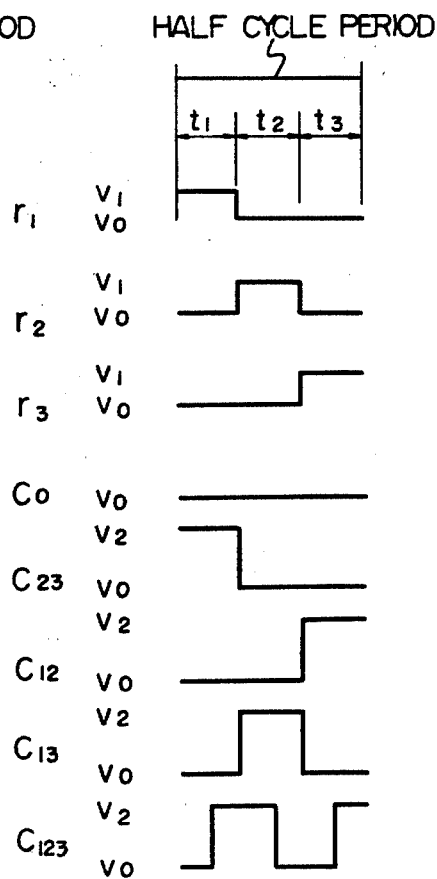

If the x, y and z axes of FIG. 4B are made to correspond to intervals t1, t2, and t3 of a half frame time, respectively, the vectors described in the drawing when converted to drive signal waveforms are shown in FIG. 5A. Further, when the drawing of FIG. 4A is slightly modified and adapted to a lattice as shown in FIG. 4C, it is possible to make a conversion into signals using two power sources and three potential levels. The relevant waveforms are depicted in FIG. 5B. In this case the operation margin is $\sqrt{5}$. This operation margin is the product of the fact that the value of Co is slightly different from the mean value $r_o$ of r1, r2, r3, and Cab does not lie on the extension of the straight line connecting $r_{ab}$ and $r_o$. The waveforms are shown only for the essential first half period; a waveform for the second half period is inverted in level so as to remove any DC component.

Referring now to FIG. 5A, there is shown a first preferred example of waveforms for row drive signals and column drive signals of a driving method of the present invention. The row drive signals r1, r2 and r3 are cyclically applied to the row electrodes 21, 22 and 23, respectively, in FIG. 3A, and the segment drive signals Co, C23 and C123 are also cyclically applied to any one of the column electrodes 24 31 of FIG. 3B. During a first time interval t1 of a half cycle period, the row drive signals r1, r2 and r3 have voltage potentials V1, V2 and V3, respectively. During a second time interval t2 of the half cycle period, the row drive signals r1, r2 and r3 have voltage potentials V2, V3 and V1, respectively. During a third time interval t3 of the half cycle period, the row drive signals r1, r2 and r3 have voltage potentials V3, V1 and V2, respectively. It will thus be seen that each of the row drive signals takes one of a plurality of voltage potentials V1, V2 and V3 during prescribed time intervals t1, t2 and t3 of the half cycle period, with a voltage potential of each of the row drive signals during one of the prescribed time intervals being different from that of each drive signal during another prescribed time interval, and that a voltage potential of one of the row drive signals r1, r2 and r3 is different from those of the other row drive signals during each time interval. In order to prevent the display of the display segments in the worst pattern, the segment drive signals employed in the present driving method does not include segment drive signals which simultaneously induce the "turned off" state at the two display segments along one column electrode and, instead thereof, the segment drive signals comprise a segment drive signal Co which induces the "turned off" or "non-display" state at all of the display segments a, b and c on all of the row electrodes 21, 22 and 23 in FIG. 3C, a segment drive signal C23 which induces the state of "display" or the "turned on" state at the display segments b and c on two row electrodes 22 and 23 in FIG. 3C, a segment drive signal C13 which induces the "turned on" state at the display segments a and b on the two row electrodes 21 and 22, a segment drive signal C13 which induces the "turned on" state at the display segments a and c on two row electrodes 21 and 23, and a segment drive signal C123 which induces the "turned on" state at all of the display segments a, b and c on all of the row electrodes 21, 22 and 23 in FIG. 3C, with only the segment drive signals Co, C23 and C123 being shown in FIG. 5A.

In FIG. 5A, the segment drive signal C0 takes a reference voltage potential V2 during each of the prescribed time intervals t1, t2 and t3, which voltage potential is equal to the mean value of first, second and third voltage potentials V1, V2 and V3 of the row drive signals r1, r2 and r3. The segment drive signal C23, which induces the state of display at the display segments on two row electrodes, takes a fourth voltage potential Vo during the first time interval t1, the reference voltage potential V2 during the second time interval t2, and a fifth voltage potential V4 during the third time interval t3, with the fourth and fifth voltage potentials Vo and V4 being different in level from any of the first, second and third voltage potentials V1, V2 and V3 of the row drive signals r1, r2 and r3. In other words, the segment drive signal which induces the display state at 1 display segments and induces the non-display state at n−l display segments along one column takes a voltage potential, during each time interval, nearly equal to a value C given by:

$$C = ro - A \sum_{j}^{Eon} (ri - ro)$$

$$ro = \left( \sum_{i}^{all} ri \right) / n$$

$$A = 2/(n - l)$$

wherein ro is the mean value of the voltage potentials of row drive signals, ri is a voltage potential of the row drive signals, during a given time interval, on which the display element is turned on, n is the number of the display elements of each column electrode, and l is the number of the turned on display elements along each column electrode. The segment drive signal C123 has the fourth and fifth voltage potentials Vo and V4 during the first time interval t1, fifth and fourth voltage potentials V4 and Vo during the second time interval t2, and fourth and fifth voltage potentials Vo and V4 during the third time interval t3. Thus, the segment drive signal C123 takes two different voltage potentials during each time interval of the half cycle period.

FIG. 5B shows another example of waveforms of row drive signals and segment drive signals to be applied to row and column electrodes shown in FIGS. 3A and 3B in another driving method of the present invention. The row drive signals r1, r2 and r3 takes first and second voltage potentials Vo and V1. More specifically, the row drive signal r1 takes the second voltage potential V1 during the first time interval t1 of the half cycle period, and the first voltage potential Vo during the second and third time intervals t2 and t3 of the half cycle period. The row drive signals r2 takes the first voltage potential Vo during the first and third time intervals t1 and t3, and the second voltage potential V1 during the second time interval t2. The row drive signal r3 takes the first voltage potential Vo during the first and second time intervals t1 and t2, and the second voltage potential V1 during the third time interval t3. The segment drive signals comprise a segment drive signal Co which induces the non-display state at all of the display segments a, b and c intersecting all of the row electrodes 21, 22 and 23 across the column electrode 31 in FIG. 3C, a segment drive signal C23 which induces the display state at the display segments b and c on the two row electrodes 22 and 23 across the column electrode 31 and induces the non-display state at the display segment a on the row electrode 21 across the column electrode 31 in FIG. 3C, a segment drive signal C12 which induces the display state at the display segments a and b on the two row electrodes 21 and 22 across the column electrode 31 and non-display state at the display segment c on the remaining single row electrode 23 across the column electrode 31, a segment drive signal C13 which induces the display state at the display segments a and c on the two row electrodes 21 and 23 across the column electrode 31, and a segment drive signal C123 which induces the display state at the display segments a, b and c on all of the three row electrodes 21, 22 and 23 across the column electrode 31.

The segment drive signal Co takes a reference voltage potential Vo during each of the first, second and third time intervals t1, t2 and t3. The segment drive signal C23 takes a third voltage potential V2 higher than the second voltage potential V1 during the first time interval t1, and takes the first voltage potential Vo during the remaining time intervals t2 and t3. The segment drive signal C12 takes the first voltage potential Vo during the first and second time intervals t1 and t2, and takes the third voltage potential V2 during the third time interval t3. The segment drive signal C13 takes the first voltage potential Vo during the first and third time intervals t1 and t3 and the third voltage potential V2 during the second time interval t2. The segment drive signal C123 takes the first and third voltage potentials Vo and V2 during the first time intervals t1, the third and first voltage potentials V2 and Vo during the second time interval t2, and first and third voltage potentials Vo and V2 during the third time interval t3. It will thus be noted that each of the segment drive signals C23, C12, C13 and C123 which induce the display state on at least two display segments has the reference voltage potential Vo during at least two selected time intervals among three time intervals t1, t2 and t3, which selected time intervals correspond to the two addressed row electrodes on which the display segments are turned on, while the segment drive signal Co inducing the non-display state on all of the display segments on all of the three row electrodes takes the reference potential Vo during all of the three time intervals of the half cycle period.

Figure 6A:
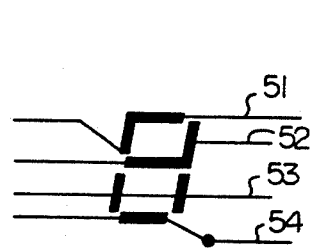
FIGS. 6A and 6B show another example of electrode arrangement of an electro-optical display device to which a driving method of the present invention is applied.
Figure 6B:
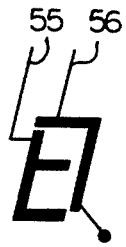
Figure 6C:
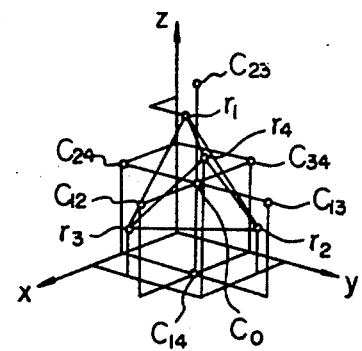
FIG. 6C is a vector diagram for drive signals to be used for the electrode arrangement shown in FIGS. 6A and 6B.
Figure 7:
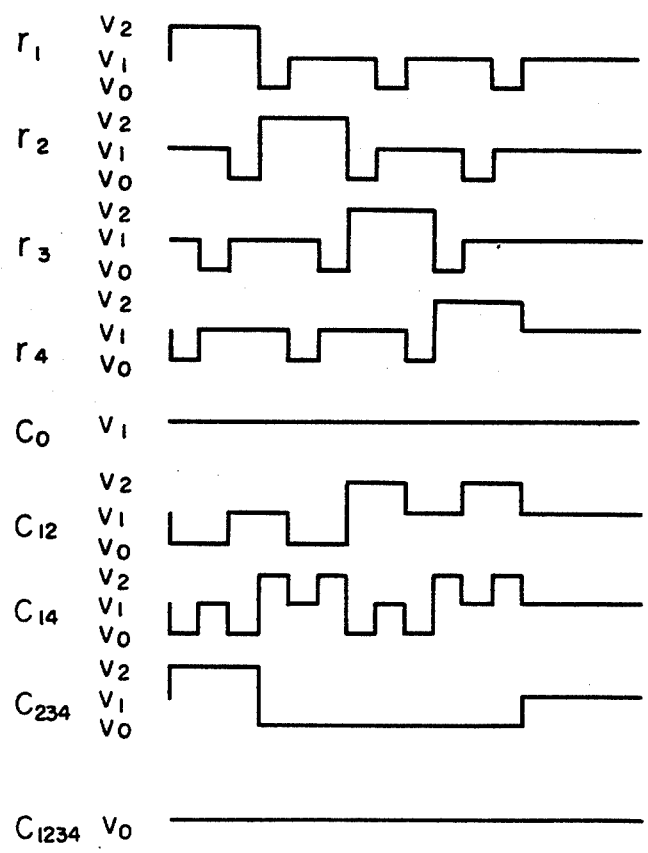
FIG. 7 is a waveform diagram for the drive signals shown in FIG. 6.

FIGS. 6A and 6B illustrate another example of electrode patterns for row electrodes 51 to 54 and column electrodes 55 and 56 of display segments arranged to provide a numeric display. From the fact that a decimal point will not be displayed alone, then for a numeric display of from 0 to 9 and for a zero-suppress state, it follows that a state in which a display element on one row is turned ON and display elements on the other three rows are turned OFF will not occur in any column. When n=4, a graph similar to that depicted in FIG. 1 may be described. If this case is considered with the exception of the curve for m=1, the undesired pattern which restricts the operation margin is the case for m=2. The ideal value for A is 1, and in this case it can be understood that the operation margin is $\sqrt{11/3}=1.915$. If the drive signal relations are depicted in terms of vectors, the row drive signals r1, r2, r3, r4 occupy the apices of a regular tetrahedron and lie on the surface of a sphere having as its center the column drive signal Co which turns all the display elements on all the rows OFF. The column drive signal C12 which turns the 1st and 2nd rows ON is separated from r4 and r3 by a distance of R and is positioned furthest from r1, r2. For m=3 and m=4 the restriction is rather liberal and there is a considerable amount of freedom; hence, the points of $C_{abc}$ $C_{abcd}$ are decided in such a manner that Von for m=3 and m=4 is equal to von for m=2. The ideal column drive signals for Co and for m=2, in terms of vectors, are determined by the 3-dimensional lattice shown in FIG. 6C. From this the waveforms four power sources and five potential levels can quickly be obtained, but when a suitable transformation of coordinates is performed the number of power sources can be further reduced. FIG. 7 shows an example of waveforms using two power sources and three potential levels.

By employing the procedure to be described hereafter it is possible to obtain drive signal waveforms for general cases. The combination and arrangement of display elements will be assumed to have been established so that there will be no appearance M column of rows m1, m2, m3 ... which are indicative of the number of several ON display elements for an animation display or the like. With $V^2on - V^2off$ taken along the horizontal axis and $V^2off$ taken along the vertical axis and omitting m1, m2, m3 ..., a graph showing the relation of equations (2) and (3) with regard to m is plotted, and a curve connecting the uppermost curves is drawn. When a line is drawn from the origin so as to contact the curve, the point of contact, depending upon which curves it lies on, will give the number of ON display elements of the undesired pattern, and the coordinates of the point of contact make it possible to obtain the column drive signals which drive the columns of the undesired pattern.

Another preferred driving method of the invention in which l exceed k and is assumed to represent an integer smaller than n will now be described. In this case, there is no column which displays a pattern where the number of display elements to be turned ON from a single column is between 1 and l−1. In other words, since m is 0 or greater than l−1, the undesired pattern is decided by the intersection of m=0 and m=l. The ideal value of A, which can be readily calculated, is 2/(n−l). The limit of the operation margin is thus $$\alpha = \sqrt{1 + 4n/\{(n-1)(n-l)\}} .$$

The drive signal is as follows. Using, in terms of vectors, symmetrical row drive signals having as a center the column drive signal Co of a column which turn off all rows, the column drive signal Cl of columns which turn l-rows ON and (n−l) rows off is located on a line connecting the mean value $\bar{r}$ of all row drive signals and the mean value $\bar{r}_{off}$ of the row drive signals of display element rows to be turned off, and Cl, $\bar{r}_{off}$, $r_o$ are aligned at a position at which the distance between Cl and $r_o$ is twice the distance between $r_o$ and $\bar{r}_{off}$. Although this is the ideal condition, slight variations will have almost no effect in so far as changing the operation margin is concerned. There are several ways in which column drive signals other than Cl can be determined: (a) value for A may be adopted such that the value of Von will become equal to that of Cl; in this case Voff is smaller than the Voff of Cl, (b) a value for A may be adopted such that the value of Voff will become equal to that of Cl; in this case Von becomes greater than Von of $C_l$ and the appearance of a non-uniformity of liquid crystal shading will be an undesirable consequence, (c) a value for A equal to that of $C_l$ may be adopted and patterns in which Von, Voff are insufficient are provided with intervals over which the row drive signal is at the normal potential level. Over these intervals the column drive signal exhibits a change in potential level nd, with $V^2on - V^2off$ held constant, $v^2on$ and $V^2off$ are increased. To state this in terms of vectors there is provided a column drive signal other than Cl in a dimension separate from the space which includes the row drive signal and Cl. This corresponds to the 1st embodiment in which n=3, l=2, and the 2nd embodiment in which n=4, l=2.

A further preferred driving method will now be described in which there is no pattern which turns OFF all the rows. For n−l≦2, the limit of the operation margin is further increased. Although for n−l=3 and n>9 this is theoretically different from the above case, the difference is substantially 0. The undesired pattern is the pattern which turns l display elements ON and n−l display elements OFF, and the ideal value for A is $$\sqrt{(n-1)/\{l(n-l)\}}$$

while the limit of the operation margin is $$\sqrt{\frac{n-l+\sqrt{l(n-l)(n-1)}}{-l+\sqrt{l(n-l)(n-1)}}} .$$

when n−l=1, A=1 the operation margin is infinity.

Figure 8:
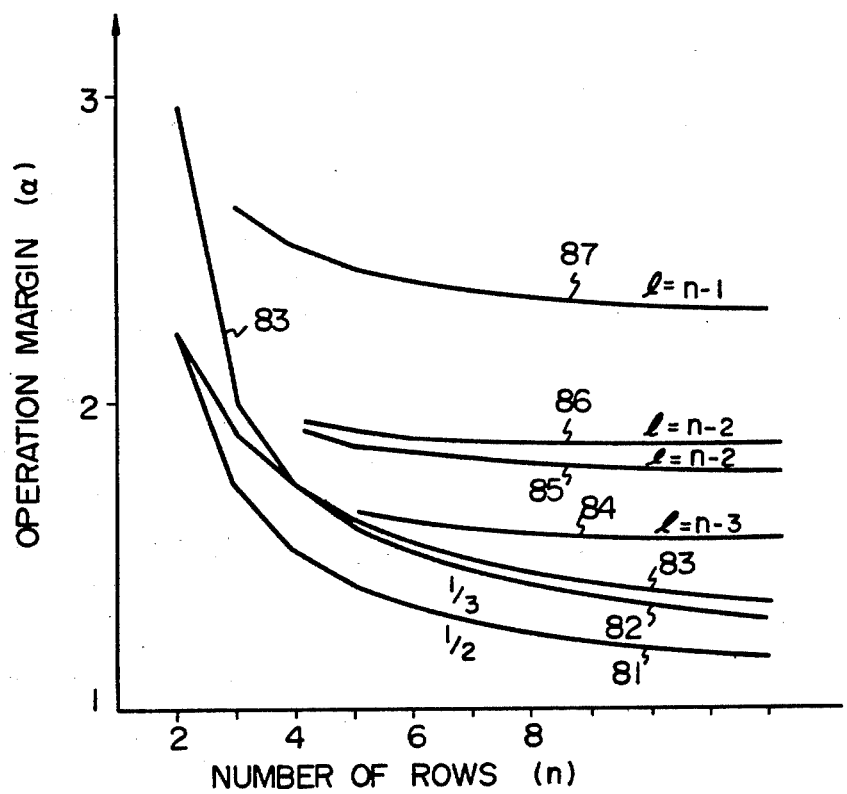
FIG. 8 is a graph illustrating the critical value of the operation margin obtained by the driving method of the present invention.

FIG. 8 illustrates how the operation margin of the present display device can be improved. The theoretical limits of the operation margin are taken along the vertical axis, the number n of matrix rows is taken along the horizontal axis, reference numerals 81, 82, 83 denote drive signals capable of driving all pattern combinations including the worst patterns, with 81 representing ½ biasing, 82 representing ⅓ biasing, and 83 denoting the theoretical limit for a case in which no restriction is placed upon the drive signal waveforms. Reference numerals 84 through 87 apply to embodiments 1 through 4 of the present invention, 84, 85, 87 designate drive signals which do not include a pattern for which the number of ON display elements is between 1 and $l-1$ inclusive; here, 84 is the case for $l=n-3$, 85 is the case for $l=n-2$, and 87 is the case for $l=n-1$. Reference numeral 86 denotes a drive signal which does not include a pattern for which the number of ON display elements is between 0 and $l-1$ inclusive; the present case is for $l=n-2$.

A still further preferred driving method of the invention will now be described with reference to FIGS. 9 and 10. The worst pattern appearing in a display device having 3 rows and q columns is the case in which display elements on all three rows are made to turn ON simultaneously in patterns in each of which a display element on one row is to be turned ON and display elements on two rows are to be turned OFF. Even if some such patterns exist the operation margin can still be improved by using non-symmetric row drive signals providing that the pattern to be turned ON has been decided. In the present embodiment a case will be described in which there will not be an occurence of those undesired patterns that would tend to turn on display elements on a 3rd row, wherein a display element on one row is to be turned ON and display elements on two rows are to be turned OFF. FIG. 10 shows a favorable relationship between row drive signals r1, r2, r3 and column drive signals Co, C1, C2, C12, C13 and C123. Namely, row drive signals lie on a circle of radius R about a center Co but do not possesses symmetry, and $\overline{r1r2}$ between rows with display elements to be turned ON alone is made to be greater than $\overline{r2r3}$ and $\overline{r1r3}$ between a row with display elements to be turned ON alone and a row with display elements which are not to be turned ON alone. In this case $\overline{r1r2}$ is $\sqrt{2}$ times $\overline{r1r3}$. $\overline{C2\,r1}$, $\overline{C2\,r3}$, $\overline{C1\,r2}$, $\overline{C1\,r3}$, and $\overline{C12\,r3}$ are all less than R, and the minimum values represented by $\overline{C1\,r1}$, $\overline{C2\,r2}$, $\overline{C12\,r1}$ and $\overline{C12\,r2}$ are maximized. Each coordinate precisely corresponds to the respective point on a square lattice. C123 is separated from Co by a distance of 2R on a line perpendicular to the plane of the drawing.

Figure 9:
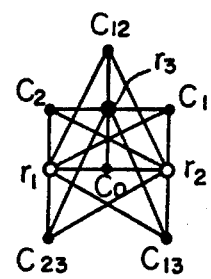
FIG. 9 is a vector diagram for another example of drive signals in accordance with the present invention.
Figure 10:
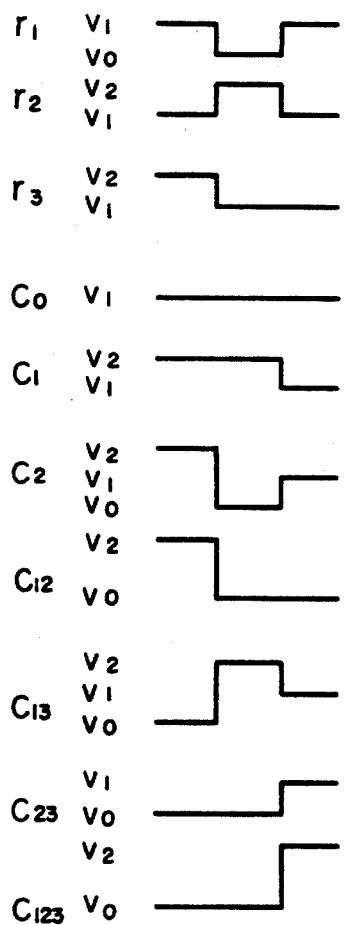
FIG. 10 is a waveform diagram for the drive signals shown in FIG. 9.

The drive signal waveforms obtained from FIG. 9 are depicted in FIG. 10. The suffix of character C denotes the number of rows with their display elements to be turned ON, and O indicates that there are absolutely no rows with their display elements to be turned ON.

Figure 12:
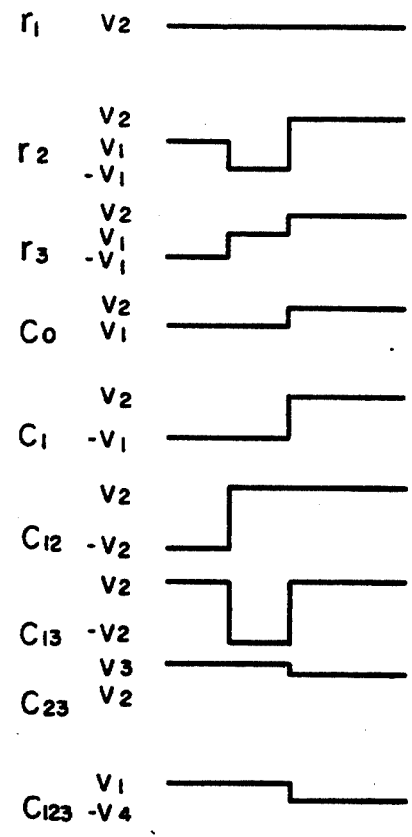
FIG. 12 is a waveform diagram for the drive signals shown in FIG. 11.
Figure 13:
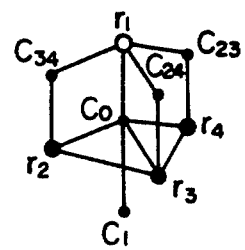
FIG. 13 is a vector diagram of a further example of drive signals in accordance with the present invention.

A modified form of a driving method of the invention will now be described with respect to FIGS. 11 and 12. In this example the undesired pattern does not appear in the 2nd and 3rd rows. In other words, a description will be given with regard to a case in which, other than the 1st row, there are no rows with their display elements to be turned ON in the undesired pattern. In other words, row drive signals lie on a circle of radius R about a center Co but do not possess symmetry, and $\overline{r1r2}$ and $\overline{r1r3}$ between rows to be turned ON and rows which are not to be turned ON in the undesired pattern are made to be greater value than $\overline{r2r3}$ between rows which are not to be turned ON. With the distances C1r2, C1r3, C12r3, C13r2 all being less than R, they are chosen so as to maximize the minimum values of $\overline{C1r1}$, $\overline{C12r1}$, $\overline{C12r2}$, $\overline{C13r1}$ and $\overline{C13r3}$. Therefore, $\overline{r1r2}$, $\overline{r1r3}$ are $1+\sqrt{2}$ times $\overline{r2r3}$. C123 is located at a point separated from Co by a distance of $\sqrt{2+2\sqrt{2}}$ on a line perpendicular to the plane of the drawing. FIG. 13 illustrates the drive signal waveforms described based on FIG. 12, and when the direction of the z-axis is converted to the 3rd interval, t3 is enlarged and an excessive increase in the power source voltage is prevented. The limit of the operation margin in this case is $\sqrt{4+2\sqrt{2}}$.

Figure 11:
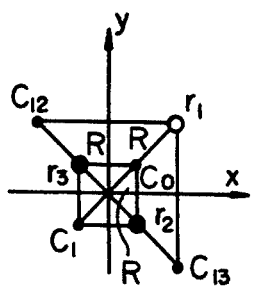
FIG. 11 is a vector diagram of a further example of drive signals in accordance with the present invention.

In FIG. 11, the four points r3 Co r2 C1 define a square having sides R, and C12 C13 r1 lie on the diagonals of the square and separated from the apices thereof by a distance of R. However, the potential levels given in FIG. 12 are fairly complicated and, with V1 expressed as unity, V2 is given as $(1+\sqrt{2})V1$, V3 is given as $\sqrt{5+4\sqrt{2}}V1$, and V4 as $\sqrt{4+4\sqrt{2}}V1-V2$.

Another modified driving method of the invention will now be described with respect to FIG. 13. In this example, a display device having 4 rows and q columns is employed, and a case is described wherein the undesired pattern in which a display element on one row is to be turned ON and display elements on 3 rows are to be turned OFF does not appear in more than one row. Row drive signals lie on a sphere of radius R about a center Co but do not possess symmetry, and $\overline{r1r2}$, $\overline{r1r3}$, $\overline{r1r4}$ between the row to be turned ON and rows which are not to be turned ON in the undesirable pattern are made to be greater than $\overline{r2r3}$, $\overline{r3r4}$, $\overline{r4r2}$ between like rows which are not to be turned ON. $\overline{C1r2}$, $\overline{C1r3}$, $\overline{C1r4}$, $\overline{C34r2}$, $\overline{C34r1}$, $\overline{C23r1}$, $\overline{C23r4}$, $\overline{C24r1}$, $\overline{C24r3}$ are less than R and are chosen so as to maximize the minimum values of $\overline{C1r1}$, $\overline{C12r2}$, $\overline{C12r3}$, $\overline{C12r4}$, $\overline{C23r3}$, $\overline{C24r2}$, $\overline{C24r4}$, $\overline{C34r3}$ and $\overline{C34r4}$. Therefore, $\overline{r1r2}$ is $\sqrt{7/6}$ times $\overline{r2r3}$. r2 r3 r4 define an equilateral triangle having sides of $2\sqrt{30}R/7$, and Co is located at a distance of $3R/7$ from the center of the triangle. In this case the operation margin is 13/7.

Figure 14A:
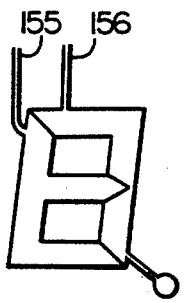
FIGS. 14A and 14B show a further example of electrode arrangement to which a driving method of the present invention is applied.
Figure 14B:
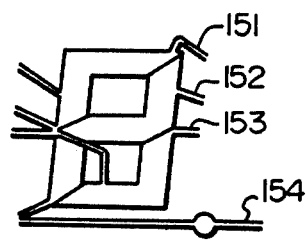
Figure 15A:
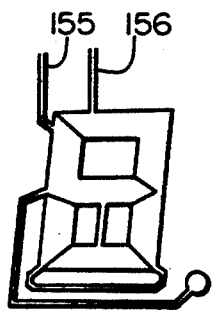
FIGS. 15A and 15B show a modification of the electrode arrangement shown in FIG. 14.
Figure 15B:
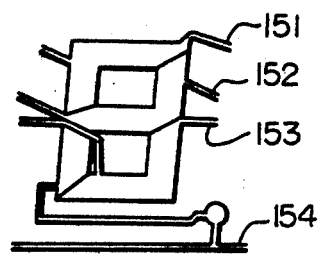

Another modified driving method of the invention will be described with respect to FIGS. 14, 15, 16, and 17. FIGS. 14A, 14B and 15A, 15B show arrangements of display element combinations applied to a numeric display device, with FIGS. 14B and 15B illustrating row electrode connections and FIGS. 14A and 14B illustrating the connections for column electrodes 155, 156. Reference numeral 151 denotes a 1st row electrode, 152 a 2nd row electrode, 153 a 3rd row electrode and 154 a 4th row electrode. When either the electrode patterns of FIGS. 14A and 14B or those of FIGS. 15A and 15B are combined, a state in which a display element on one row is turned ON and display elements on the other three rows are turned OFF will not occur regardless of which column electrodes 155, 156 are considered since decimal points will not be displayed alone for a numeric display of from 0 to 9 and for a zero-suppress state. Thus, an undesirable pattern, i.e., a pattern in which display elements on two rows are turned ON and display elements on two rows are turned OFF does not occur in all rows and undesirable patterns other than those patterns in which the 1st row and 2nd row, 1st row and 3rd row, and 2nd row and 3rd row are turned ON do not occur.

Figure 16:
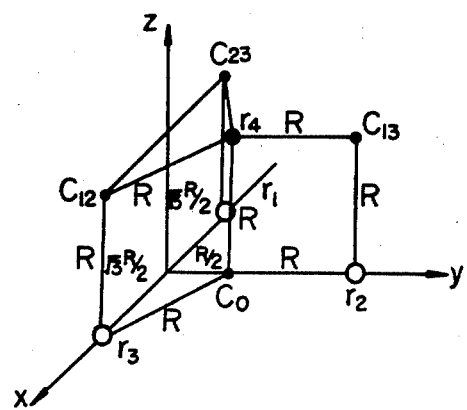
FIG. 16 is a vector diagram of a further example of drive signals in accordance with the present invention.

FIG. 16 shows the ideal positional relationship between row drive signals r1, r2, r3, r4 and column drive signals Co, C12, C13 and C23. Row drive signals r1, r2, r3, r4 lie on the surface of a sphere having a radius about a center Co, and r1, r2, r3 are plotted on points to define an equilateral triangle. Row r4 which is not to be turned ON is positioned on a line passing through the center of the equilateral triangle such that the distance r1r4 is shorter than the side of the triangle. $\overline{C12\,r3}$, $\overline{C12\,r4}$, $\overline{C13\,r2}$, $\overline{C14\,r4}$, $\overline{C23\,r1}$, $\overline{C23\,r4}$ are less than R and, when chosen so as to maximize the minimum values of $\overline{C12\,r1}$, $\overline{C12\,r2}$, $\overline{C13\,r1}$, $\overline{C13\,r3}$, $\overline{C23\,r2}$ and $\overline{C23\,r3}$, each of the quadrilaterals Co r3 C12 r4, Co r1 C23 r4 and Co r2 C13 r4 becomes a square with sides R. $\overline{r1r2}$ is thus $\sqrt{3/2}$ times $\overline{r4r1}$, and the operation margin is 2.

Figure 17:
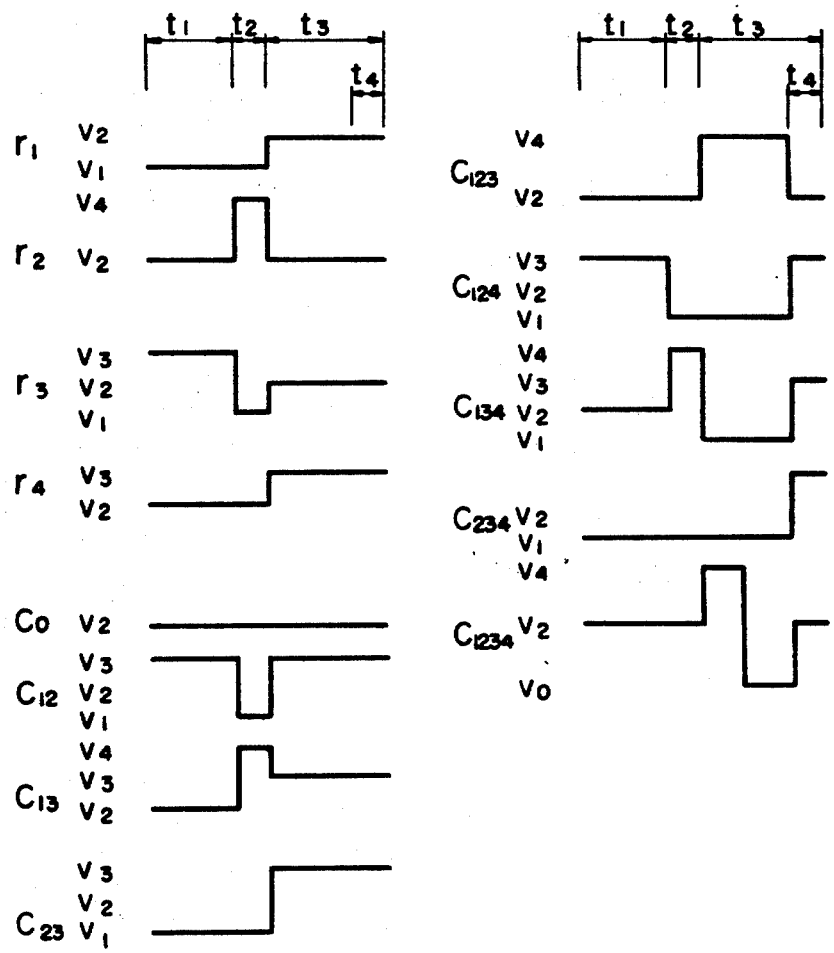
FIG. 17 is a waveform diagram for the drive signals shown in FIG. 16.

FIG. 17 shows an example of the drive signal waveforms which are obtained. The x, y and z coordinates of FIG. 16 are brought into correspondance with intervals t1, t2 and t3, and these intervals are adjusted to a ratio of 3:1:4 respectively and t4 set equal to t3/4 so that the ratios among the potential levels will be integer.

Figure 18:
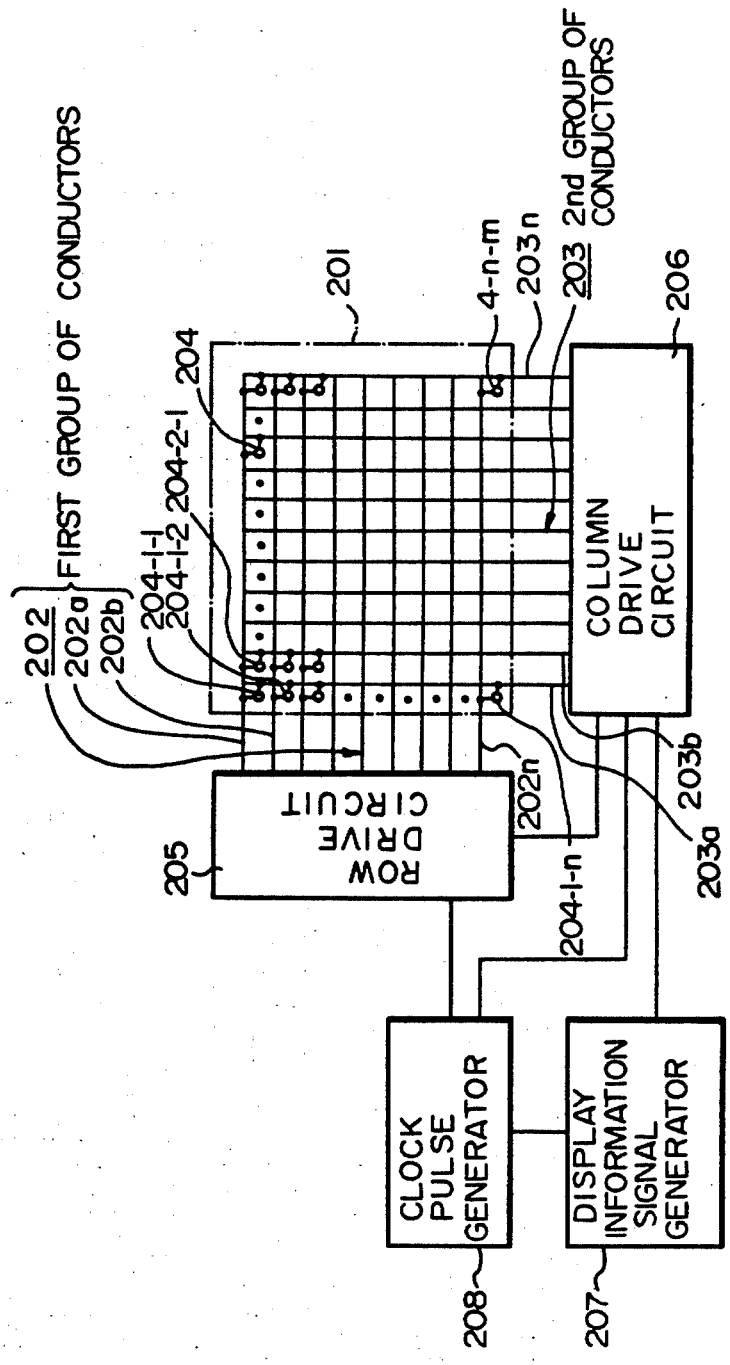
FIG. 18 is a block diagram of a driver circuit for an electro-optical display device in accordance with the present invention.

FIG. 18 is a block diagram illustrating the constitution of a preferred example of an electro-optical display device in accordance with the invention. Reference numeral 201 denotes a display panel and reference numerals 202 and 203 designate electrical conductors corresponding to row and column electrodes for transmitting drive signals. These conductors consist of a row group 202a, 202b, ... 202n and a column group 203a, 203b ... 203m. Reference numeral 204 denotes a display surface composed of display elements (204-1-1), (204-1-2), ... (204-2-1), ... (204-n-m); individual display elements consist of an electro-optical substance connected between one conductor from the 1st group of conductors 202 and one conductor from the column group of conductors 203. As an electro-optical substance there may be employed liquid crystals, an electro-chromic material, substances such as PLZT which undergo a change in crystal structure due to an electric field, semiconductors such as LEDs, substances which undergo elastic deformation due to an electric field, discharge elements, incandescent resistors, exothermic elements and substances which experience a change in color in response to temperature changes, electro-phoretic substances, coils and magnetic elements, and electrochemical substances which experience changes in color. Reference numeral 205 denotes a row drive circuit for generating row drive signals which are supplied to the row group of conductors 202.

Reference numeral 256 designates a column drive circuit for generating column drive signals which are supplied to the column group of conductors 203, with drive signals being applied to respective conductors 203a, 203b, ... 203m in response to information obtained from display information signal generator 207. Reference numeral 208 denotes a clock pulse generator for operating the display device and may also serve as a clock to display information signal generator 207 if so required. Finally, the power source for the display device is not shown in the drawing.

As for the operation of the display device consideration will first be given to display elements (204-1-1), (204-1-2), ... (204-1-n) connected between conductors 202a, 202b, ... 202n and conductor 203a. The voltage impressed upon the display elements is equal to the difference in voltage between the drive signals supplied to the two conductors which are connected to each respective display element. Thus, display element (204-1-1) coupled between conductors 202a and 203a will be turned OFF if the rms value of the voltage difference between the drive signals of conductos 202a and 203a is low, and will be turned ON if that voltage difference is high. Display elements (204-1-2) ... (204-1-n) are all in a selected state since they have been supplied with a non-zero voltage attributable to the fact that the drive signals transmitted by conductors 202b ... 202n and 203a are mutually independent. If it is assumed that a drive signal delivered by conductor 203a is independent of each of the drive signals supplied by conductors 202a ... 202n, then the entire column of display elements (204-1-1), (204-1-2), ... (204-1-n) connected to conductor 203a is in a selected state since a non-zero voltage is impressed upon each of these display elements. Thus, a single arbitrary display element in the column of display elements (204-1-1) ... (204-1-n) can be brought to a non-selected state, or all of the display elements in the column can be brought to a selected state by either arranging it so that a drive signal supplied to conductor 203a is in phase with any one of the drive signals supplied to conductors 202a ... 202n, or by arranging it so that the drive signal delivered by conductor 203a is independent of each of the drive signals associated with conductors 202a ... 202n. In the same way, the drive signals delivered by conductors 203b ... 203m make it possible either to bring to a state of non-selection a single arbitrary display element in the corresponding column, or to bring to a selected state all of the display elements in the corresponding column. Therefore, the display device can be operated so as to display the graph of a single-valued function. It is also possible to reduce power consumption and lengthen display element lifetime by applying the drive signals intermittently and then either short-circuiting or opening the circuit connected to the conductors during quiescent time. The drive signals may also be time-multiplexed and used to successively bring a plurality of display elements into a non-selected state.

Figure 19:
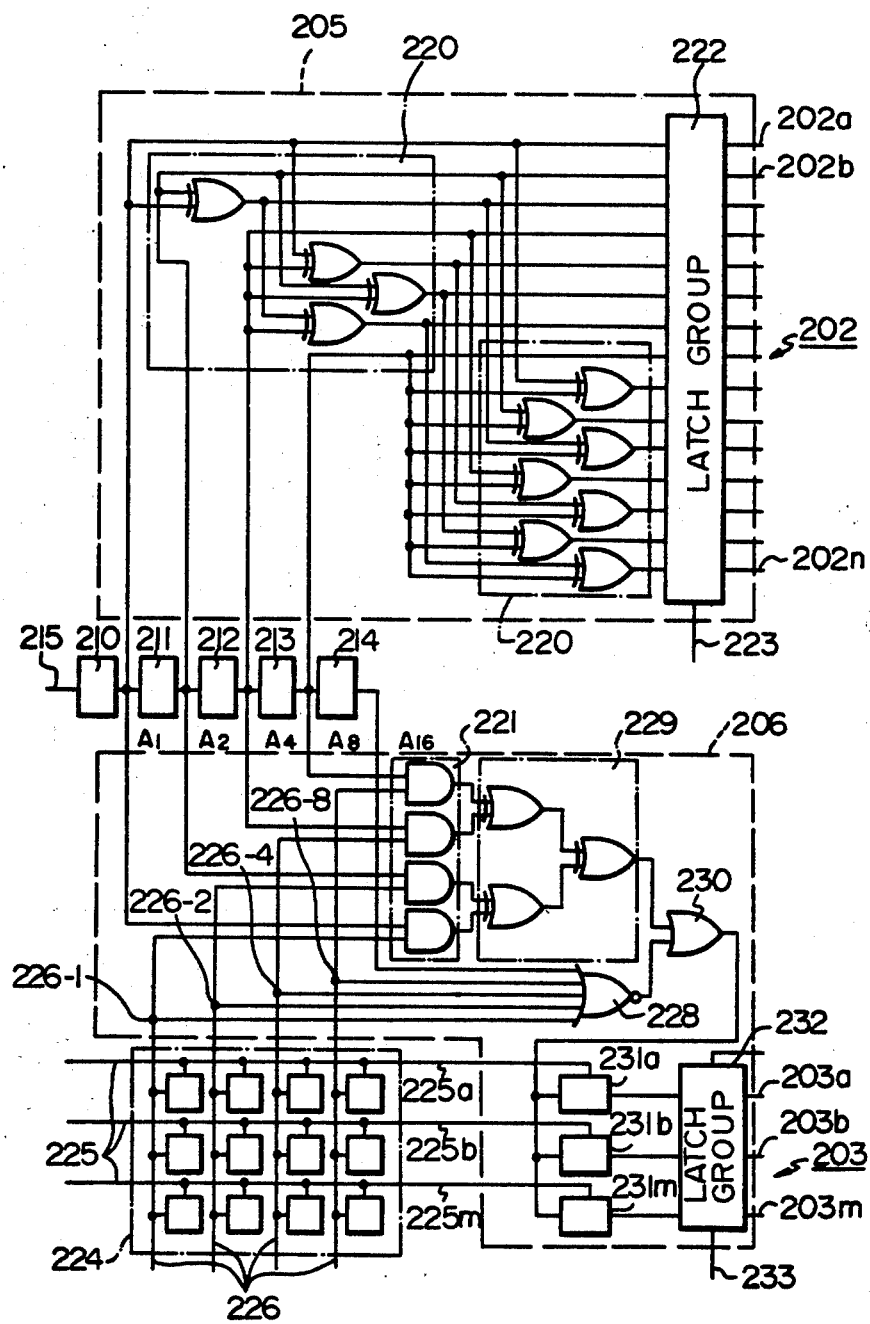
FIG. 19 is a detail electric circuitry for a part of the driver circuit shown in FIG. 18.

FIG. 19 illustrates a specific embodiment of the row drive circuit 205 and column drive circuit 206, and FIGS. 23, 24, 25, 26A and 26B illustrate arrangements for connecting the display elements of display devices to be driven by the circuit of FIG. 19.

As will be described in detail hereinafter, the group of row conductors and the group of column conductors in such a display device are connected such that, of the display elements connected to one conductor in the group of column conductors, two or less display elements will be turned OFF. FIG. 19 corresponds to the case in equation (2) given above, for which the number m of ON connections of display elements is equal to (n−1), while A is equal to one. Thus, this example satisfies the condition:

Voff=0.

The display drive circuit of FIG. 19 supplies the group of row conductors 202a, 202b, ... 202n, with mutually independent drive signals, and supplies the group of column conductors 203a, 203b, ... 203m, with drive signals in accordance with the display information, as will now be described.

To turn ON all of the display elements coupled to one specific conductor in the group of column conductors, that column conductor is supplied with drive signals which are independent of all of the drive signals applied to the group of row conductors. To turn OFF the display elements connected to the ith conductor in the group of row conductors, while turning ON the display elements of the other conductors in the group of row conductors, the conductor in the group of column conductors that is coupled to the display element to be turned OFF is supplied with a drive signal which is identical to the drive signal applied to the ith conductor in the group of row conductors.

The configuration and operation of the circuit will now be described, referring to FIG. 19 and to the waveform diagrams of FIG. 20A and FIG. 20B. Reference numerals 210, 211, 212, 213 and 214 denote T-type flip-flops connected in a cascaded form, and reference numeral 215 represents the input terminal for their initial stage. The flip-flop outputs A1, A2, A4, A8 are connected to the input terminals of exclusive OR gate group 220 of the row drive circuit 205 and the input terminals of AND gate group 221 of the column drive circuit 206. Flip-flop outputs A1 through A8 and the outputs obtained from exclusive OR gate 220 are connected to the input side of latch group 222 which is triggered by pulses obtained from clock input terminal 223. The output side of latch group 222 is connected to respective conductors 202a, 202b, ... 202n of conductor group 202. Latch circuit 222 also serves as a power amplifier for the purpose of driving the display elements. Reference numeral 224 denotes a signal source for storing display information signal; pulses when input to one line of information selection line 225 appear as information output signals at signal output line 226. Signal output line 226 is connected to the input terminals of AND gate group 221, the output of flip-flop 214, and the input terminals of NOR gate 228. The output terminals of AND gate 221 are connected through the intermediary of exclusive OR gate group 229 to the input terminals of OR gate 230 along with the output of NOR gate 228. The output of OR gate 230 is connected to the input terminals of latches 231a, 231b, ... 231m which are triggered by respective information selection lines 225a, 225b ... 225m that comprise information selection line 225, the outputs obtained from the latch circuits being connected to the input side of latch group 232 which is triggered by pulses that appear at clock input terminal 233. The output side of the latch group 232 is connected to respective conductors 203a, 203b, . . . 203m.

Figure 20A:
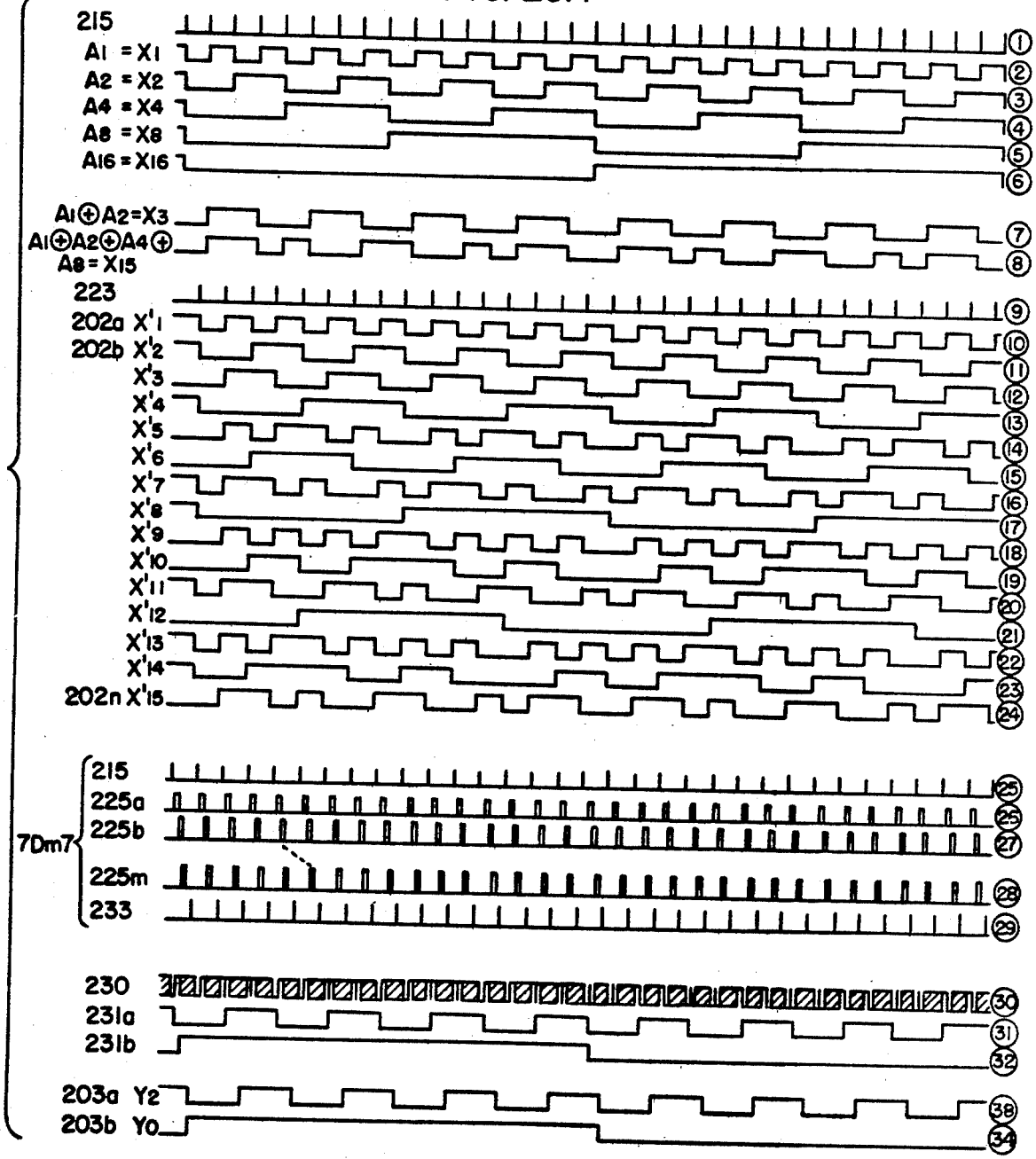
FIGS. 20A, 20B and 20C are waveform diagrams for drive signals obtained by the circuit of FIG. 19.
Figure 23A:
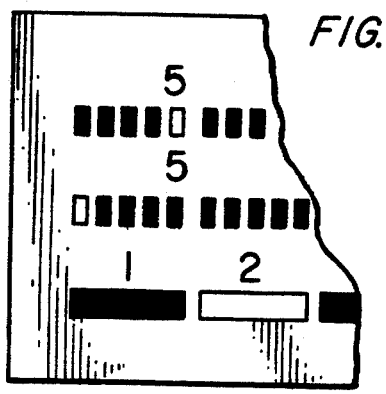
FIGS. 23, 23A and 24 show a modified form of an electrode arrangement for an electro-optical display device to which a driving method of the present invention is applied.
Figure 20B:
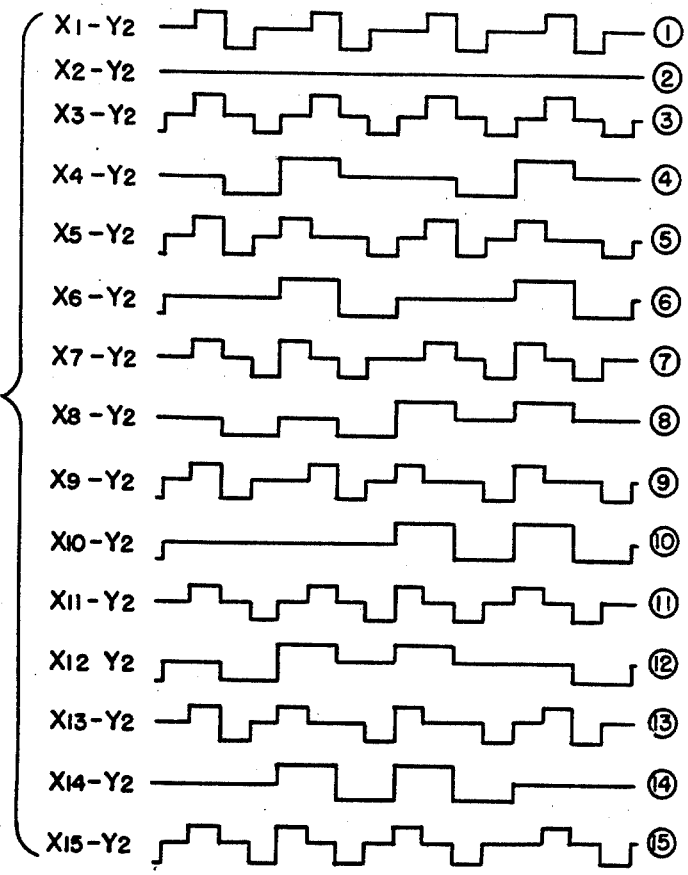

In operation, the waveforms designated by FIG. 20A(2), (3), (4), (5), (6) are obtained at the respective outputs A1, A2, A4, A8 and A16 of flip-flops 210 through 214 when clock pulses shown in FIG. 20A(1) are applied to input terminal 215 of flip-flop 210. A wave shaping circuit comprising exclusive OR gate group 220 produces the following waveform at the i-th input terminal of latch 222 based upon the outputs A1, A2, A4 and A8: with i represented as a binary number and assuming that $$i = a_1 + a_2 \times 2 + a_4 \times 2^2 + a_8 \times 2^4,$$

a waveform Xi at the i-th input terminal is given by $$Xi = (a_1 \cdot A_1) \oplus (A_2 \cdot A_2) \oplus (a_4 A_4) \oplus (a_8 \cdot A_8),$$

wherein $\oplus$ represents an exclusive OR operation and (.) represents an AND operation. Thus, by way of example, the input signal waveform at the 15th input terminal is as denoted by g in FIG. 20. Pulses denoted by h which possess the same period as the pulses a applied to flip-flop input terminal 15 but which are delayed in phase are impressed upon the clock input terminal 223 of latch 222. At the output side of latch 222, namely conductors 202a, 202b ... 202n, there will appear a drive signal which possesses the same waveform as Xi and is in synchronism with the signal at clock input 223. The waveform which appears as an output signal at conductors (202a to 202n) is designated by i in FIG. 20(A) (10) to (24). If the period of waveform A8 is taken as $\tau$ and Eo is assumed to be the mean value of the high and low levels of the drive signal, then $$\int_{t_0}^{t_0+\tau} \{Xi(t) - Eo\} \{Xj(t) - Eo\} dt = 0, i \neq j.$$

Accordingly, the drive signals which appear as output signals at conductors 202a, 202b ... 202n are independent of each other.

Next, the formation of a drive signal delivered by conductor 203 will be described. When a pulse is input to one line of information selection lines 225, an information signal indicative of which position of a corresponding row is to be brought to a non-selected state is delivered from signal source 224 in the form of a binary number and is transmitted as an output to signal output line 226. A 1-digit signal b1 is delivered to line 226-1, a 2-digit signal b2 to line 226-2, a $2^2$-digit signal b4 to line 226-4, and a $2^3$-digit signal b8 is delivered to line 226-8. These signals are applied to AND gate group 221 and exclusive OR gate group 229 which perform the following operation: $Y = b_1 \times A_1 \oplus b_2 \times A_2 \oplus b_4 \times A_4 \oplus b_8 \times A_8$. Therefore, this is the same as the Xj signal represented by $j = b_1 + b_2 \cdot 2 + b_4 \cdot 2^2 + b_8 \cdot 2^3$. When $j \neq 0$, the output of the exclusive OR gate passes as it is through OR gate 230 and is applied to the input terminals of latches 231a, 213b ... 231m, whereby the latches for the rows selected by information selection line 225 are set. When j=0 and if there is no position to be brought to a non-selected state, the signals carried by signal output line 226 at such time are all zero so that $\overline{A}_{16}$ appears at the output of NAND gate 228, is passed by OR gate 230 and applied to the input terminals of latches 231a, 231b ... 231m. During the short interval of time which begins after a pulse has been applied to flip-flop input terminal 215 and which continues until a pulse has been applied to clock input terminal 223 of latch 222, the entire information selection line 25 is scanned and the signal levels are memorized in all of the latches 231a, 231b ... 231m. When pulses are applied to clock input terminal 233 of latch 232 so as to conform in timing to the pulses applied to clock input terminal 223 of latch 222, outputs obtained from latches 231a, 231b ... 231m are delivered to conductors 203a, 203b ... 203m in synchronism with those delivered to conductor group 202. Thus, in conformance with the content of signal source 224, a signal having a waveform identical to the j-th signal Xj of conductor group 202 if $j \neq 0$, and a signal having a waveform identical to that of $\overline{A}_{16}$ if j=0, are delivered to conductor group 203 in synchronism with the pulses applied to clock input terminals 223, 233. When j=0 and if the period of waveform $A_{16}$ is given by $\tau$ and the mean value of the high and low voltage levels of the drive signal by Eo, then $$\int_{t_0}^{t_0+\tau} \{Xi(t) - Eo\} \{\overline{A}_{16} - Eo\} dt = 0.$$

Accordingly, $\overline{A}_{16}$ is independent of each waveform Xi. This will now be explained in more detail. It will be assumed for illustration of display device 204 in FIG. 18 that, of the display elements (204-1-1), (204-1-2), ... (204-1-m), connected to column drive conductor (203a), display element (204-1-2), which is connected to the second row drive conductor, will be in the OFF state, while the other display elements, i.e. (204-1-1), (204-1-3)

... (204-1-m) will be in the ON state. It will also be assumed that all of the display elements (204-2-1), (204-2-2), ... (204-2-m) which are connected to the column drive conductor (203b) are in the ON state.

In this case, the memory contents appearing on data selector line 225a, corresponding to display data stored in signal source 224, will be assumed equal to 2, expressed in binary form. Thus, b1=0, b2=1, b4=0, b8=0. As a result, in response to a signal pulse on data selector line 225a, the outputs on signal leads (226-1), (226-2), (226-4) and (226-8), will be 0, 1, 0 and 0 respectively, in binary form. If the memory contents corresponding to the data selector line 225b are assumed to be zero, then in this case, b1=0, b2=0, b4=0 and b8=0. Thus, the signals produced in response to a pulse on data selector line 225b, on signal lines (226-1), (226-2), (226-4) and (226-8) will all be zero.

As shown in FIG. 20A(25) to (29), when pulses are applied to input terminal 215 of flip-flop 210, then after the operation of flip-flop outputs A1, A2, A4 and A8 has stabilized, the pulses shown in FIG. 20A(26) will appear on data selector line 225a. While these pulses are at the high level, then in accordance with the contents of signal source 224, signal lines (206-1), (206-4) and (206-8) will be at the 0 level, while line (206-2) will be at the 1 level. The output of NOR gate 228 will go to the 0 level, as a result of signal line (226-2) being at the 1 level. On the other hand, of the AND gate group 221, those AND gates which are coupled to signal line (226-2) and to A2 will produce outputs which are at the same level as signal A2, while the other three AND gates of that group will produce outputs at the 0 level. The output of exclusive-OR gate 299 will therefore be identical to signal A2, in level. Thus, the output of OR gate 230 will be at the same level as signal A2. In other words, if the second row is in the OFF state, then as a result of the display data contents being equal to 2, signals corresponding to b1=0, b2=1, b4=0, and b8=0, will appear on signal lines (226-1), (226-2) (226-4) and (226-8). The output of OR gate 230 is given as:

$$Y2 = (b1 \cdot A1) + (b2 \cdot A2) + (b4 \cdot a4) + (b8 \cdot A8)$$
$$= 0 + A2 + 0 + 0$$
$$= A2.$$

This output is shown in FIG. 20A(30), and as can be seen, while signal line (225a) is held at the high logic level, this high level state is read into latch (231a), which is in the activated state. When signal line (225a) goes to the low level, then this state is read into latch (231a), and thereby stored as data. Thus, as shown in FIG. 20A(31), the output of latch 231a memorizes the waveform of the column drive signal.

After the data selector line 225a has gone to the low level, the pulses shown in FIG. 20A(27) are applied on signal line 225b. As in the previous case, while these pulses are at the high level, signal line (226-1), (226-2), (226-4) and (226-8) are set to the 0 level, in accordance with the contents of signal source 224. The output of NOR gate 228 goes to the same level as signal A16. On the other hand, the output signals of all of the AND gates in group 221 are at the 0 level. Thus, all of the outputs of the exclusive-OR gate group 229 are at the 0 level, and the output of OR gate 230 becomes identical in level to signal A16. The latter output is shown in FIG. 20A(30), and as shown, while signal line 225b is held at the high level, since signal line 22b is coupled to the intput terminals of latches 231a, 231b, ... 231m, the high state is read into latch 231b, which is set into the active condition. Due to latch 231a being inactive, its previous output remains unchanges.

When signal line 225b goes to the low level, the data which has been read into latch 231b is held stored, so that the output waveform shown in FIG. 20A(32) is produced. After data selector line 225b has gone to the low level, then the other data selector lines (225-m) are successively scanned. The signals which are thus processed by AND gate group 221, exclusive-OR gate group 229, NOR gate 228, and OR gate 230, is read into the latch circuit group 231m. The output of NOR gate 228 will change, thereafter. However this will have no effect on the outputs from latches 231a, 231b, as is indicated by the hatched portions of FIG. 20A(30).

After scanning of the data selector lines 225 is completed, the pulses shown in FIG. 20A(9) and (29) are applied simultaneously to the clock input terminals of latch group 222 and latch group 232. Drive signals synchronized with the latter pulses are applied to the group of row conductors 202 and the group of column conductors 203. The waveforms of the drive signals applied to the group of row conductors 202a, 202b, ... 202n, are shown in FIG. 20A(10), (11), ... (24). The waveforms of the drive signals applied to the conductors 203a and 203b, of the group of column conductors, are shown in FIG. 20A(33) and (34).

The potentials applied to the corresponding display elements will now be described. The potential difference (X1−Y2) will be applied to display element (204-1-1), which is connected at the intersection of row drive conductor 202a, coupled to receive drive signal X1, and column drive conductor 203a, coupled to receive drive signal Y2. This is shown in FIG. 20B(1).

During $\frac{1}{2}$ of a period, the potential difference is zero.

During $\frac{1}{4}$ of the period, the potential difference is +V.

During $\frac{1}{4}$ of the period, the potential difference is −V.

The potential difference (X2−Y2) is applied to the display element (204-1-2), which is connected at the intersection of row drive conductor 202b, to which drive signal X2 is applied, and column drive conductor 203b, to which drive signal Y2 is applied. In this case, as shown in FIG. 20B(2), that display element will be in the OFF state for the entire period. Similarly, the potential differences (X3−Y2), ... (X15−Y2), shown in FIG. 20B(3) to (15), are applied to display elements (204-1-3), ... (204-1-m), respectively. When any of these display elements is subjected to the same rms value of potential difference as display element (204-1-1), then it is set into the ON state.

Figure 20C:
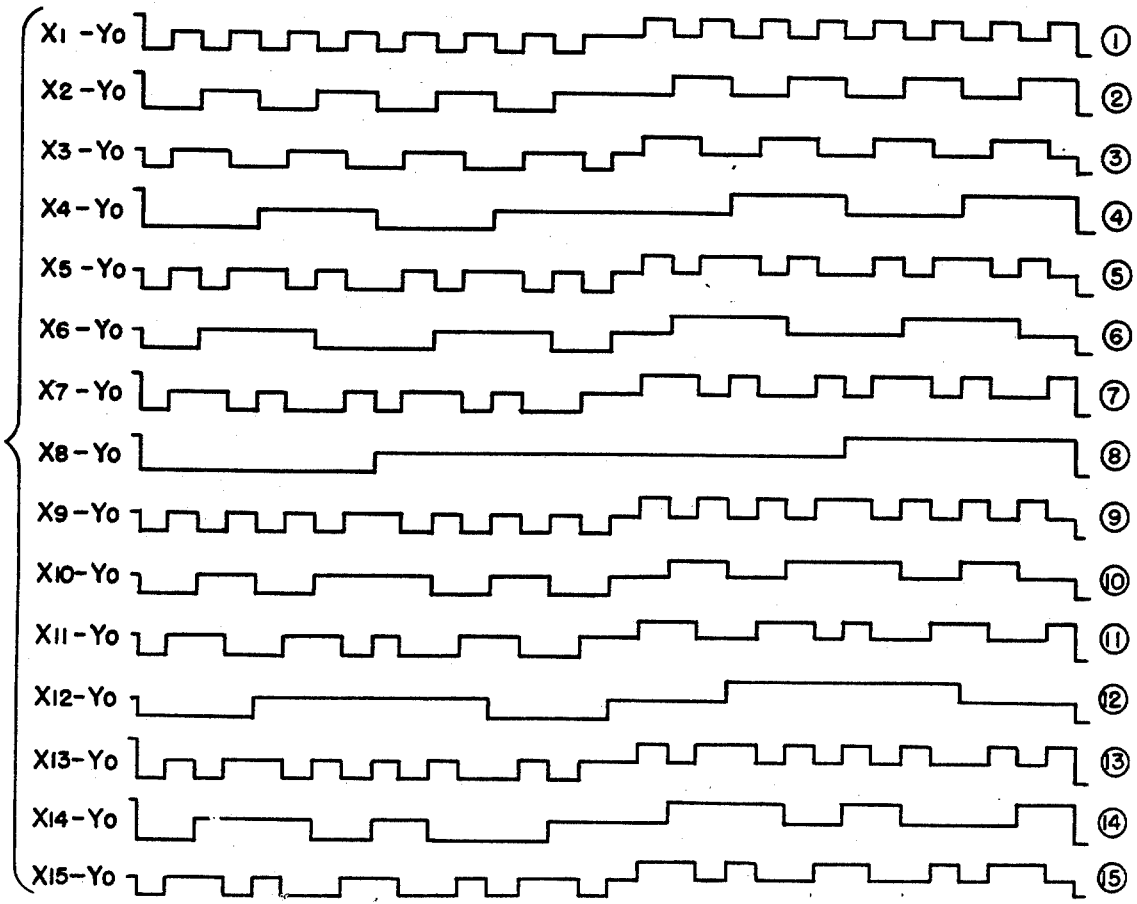

The second column will now be discussed. The potential difference applied to display element (204-2-1) is the difference (X1−Y0) of the voltage X1 of row drive conductor 202a and voltage Y0 of column drive conductor 203b. This is shown in FIG. 20C(1). Similarly, the potential difference applied to display elements (204-2-2), ... (204-2-m), are (X2−Y0), ... (X15−Y0), respectively. These are shown in FIG. 20C(2) to (15). When the voltage applied to any of these display elements is identical to the rms value of the voltage applied to display element (204-1-1), then that display element is set in the ON state.

OR gate 228 and OR gate 230 are provided so that display element 204 will not be applied with a DC component when J=0; however, in cases where the presence of a DC component is acceptable such as in instances where incandescent elements are employed, the final output obtained from exclusive OR gate group 229 may be connected directly to the input sides of latches 231a, 231b . . . 231m.

Figure 21:
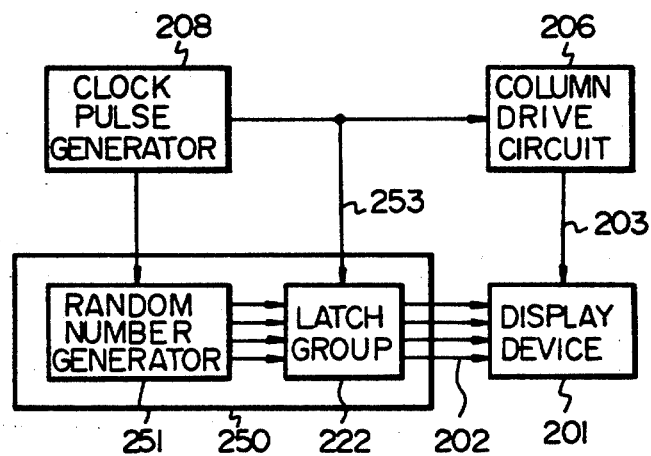
FIG. 21 is a modified form of row drive circuit shown in FIG. 19.

FIG. 21 shows a modification of row drive circuit 205. Reference numeral 251 denotes a random number generator which is constructed so as to generate n random numbers is synchronism with the signals provided by clock pulse generator 208. The random number generator may make use of such random physical phenomena as thermal noise or atomic decay or may utilize a pseudorandom number generating mechanism using digital calculation circuits. In particular, it is possible to make combined use of the functions of a calculator if the display device of the present invention is employed as the calculator display. The n bit output signals from random number generator 251 are connected to n input terminals of latch group 222 and, random signals are stored in synchronism with the application of signals to clock input terminal 253, with the random number signals being supplied as drive signals to respective conductors 202 of display device 201. For a situation in which the application of a DC component to the drive signal is undesirable as is the case when driving a liquid crystal display element, a single clock cycle is further divided into equal first and second halves. During the first half of the cycle the random number signals are employed as they are for drive signals while, during the second half of the cycle, signals which are the reverse of those utilized during the first half may be employed as the drive signals. Furthermore, it is not absolutely necessary that random number generator 251 produce n output signals simultaneously; a small number of random number signals may be generated in serial fashion and then distributed successively among each of the latches 222. When making use of random numbers for the drive signals there is no periodic regularity so that even if the period of the clock pulses is fairly small there is no regular display noise, a factor which is suited to a case where there is a large number of conductors 202.

Figure 22:
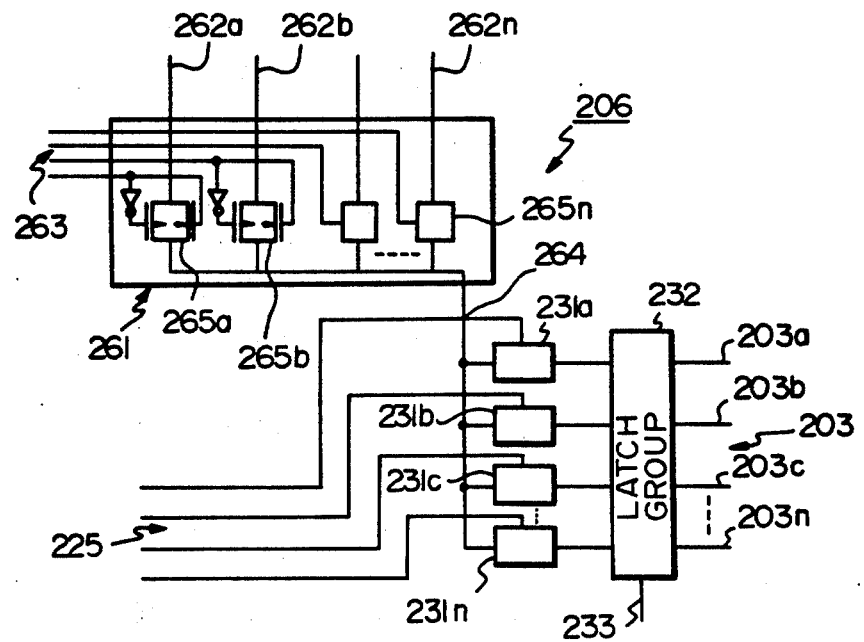
FIG. 22 is a modified form of the column drive circuit shown in FIG. 19.

FIG. 22 is a modification of the column drive circuit 206. Here, column drive circuit 206 produces column drive signals which are founded upon the drive signals produced within the row drive circuit 205. The data input terminals 262a, 262b . . . 262n of a multiplexer 261 are connected to a signal source within row drive circuit 205, i.e., to the respective input terminals of latch group 222, shown in FIG. 9, and thus the signal levels to be supplied to conductors 202a, 202b . . . 202c are received by the multiplexer as input signals. However, signal A1 shown in FIG. 20A(2) is applied to 262a, while signal A2 shown in FIG. 20A(3) is applied to 262b. Xi is input to the i-th input terminal of the multiplexer. The data to be displayed is applied to the address input terminals of multiplexer 261. Input information to be displayed is applied to address input terminal 263 of the multiplexer 261, and address input signals corresponding to these inputs are selected from among 262a, 262b . . . 262n and delivered to output terminal 264. It should be noted here that the multiplexer can be constructed to incorporate transmission gates 265a, 265b, 265n. Multiplexer output terminal 264 is connected to latch groups 231a, 231b . . . 231n and latch group 232, and the multiplexer output signals due to the scanning of signals carried by information selection line 225 are successively applied into latches 231a, 231b . . . 231n and delivered as drive signals to respective conductors 203 in synchronism with the application of signals to clock input terminal 233. Similarly, in the case of the column drive conductor (203a), the display element (204-1-2) connected to the second row electrode is set OFF, while the other display elements are set ON. The case in which all of the display elements (204-2-1), (204-2-2) . . . (202-4-n) connected to the second column drive conductor 203b are set in the ON state will now be described.

Address input terminal 263 of multiplexer 261 is normally at the high level, so that the switch circuit comprising transfer gates 265a . . . 265n, is open. The pulses shown in FIG. 20A(26) are input on the first data selector line 225 corresponding to the first column conductor 203a, and at the same time the second address input terminal 263 is set to the low level. The second transfer gate 265b is closed, so that a signal at the same level as the second row drive signal A2 is output from the multiplexer and is read into latch 231a. Next, the pulses shown in FIG. 20A(27) are applied to the second data selector line (225) corresponding to the second column conductor 203b, and in synchronism with this, the 16th one of the address input terminals 263 is set to the low level. The 16th transfer gate is thereby closed, and a signal at the same level as A16 (i.e. the 16th drive signal) appears on the multiplexer output terminals of the multiplexer, and is read into latch 231b. In this way, the data is read successively into the latches, up to latch 231m. Thereafter, the pulses shown in FIG. 20A(29) are applied to the clock input terminal 233 of latch group 232, whereupon the outputs of latches 231a, . . . 231m are read into the latch group 232, so that the column drive signals shown in FIG. 20A(33) and (34) are output. The waveforms of these drive signals are the same as those described above for the embodiment of FIG. 19.

When there is a small number of terminals at the output 202 of the row driver circuit 205, multiplexers equal to m terminals for the output 203 of column drive circuit 206 can be installed without difficulty. In such a case drive circuits such as 205 and 206 shown in FIG. 34 can be constructed without requiring the incorporation of latch circuits. Moreover, the drive signals need not be restricted to only two values, i.e., to only high and low potential levels. For example, it is possible to employ drive signals which include any potential level such as signals which describe a sinusoidal wave.

Figure 23:
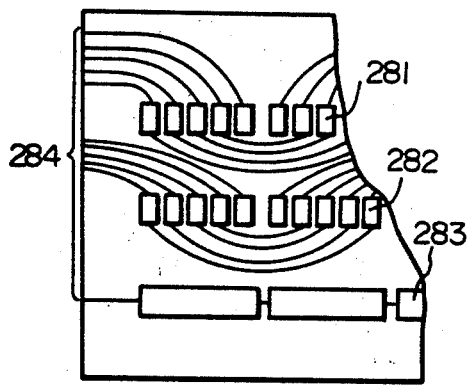
Figure 24:
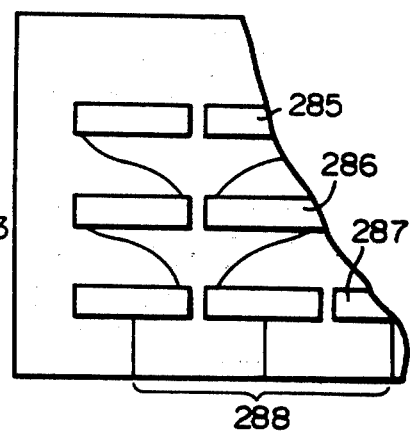

FIGS. 23 and 24 illustrate a portion of an example of an electrode arrangement on a liquid crystal display panel. 60 points produced by electrodes 281 and 285, 60 points produced by electrodes 282 and 286, and 12 points produced by electrodes 283 and 287 are utilized in displaying seconds, minutes and hours, respectively. Electrodes 285, 286 and 287 are each divided into 12 portions and connected to the row drive circuit by means of conductors 288. Electrodes 281 and 282 are each divided into 5 portions and, along with electrode 283, are connected to the column driver circuit by means of conductor 284. It is clear that only 23 conductors make it possible to select any point of the hours, minutes or seconds display. Since there is no voltage applied at the selected point, a display state is not induced; coloration will be induced at the non-selected point. It goes without saying that in the case of a twist-nematic type liquid crystal it is possible to induce a display state of only the selected point if the orientation of the polarizing plates is changed.

Figure 25:
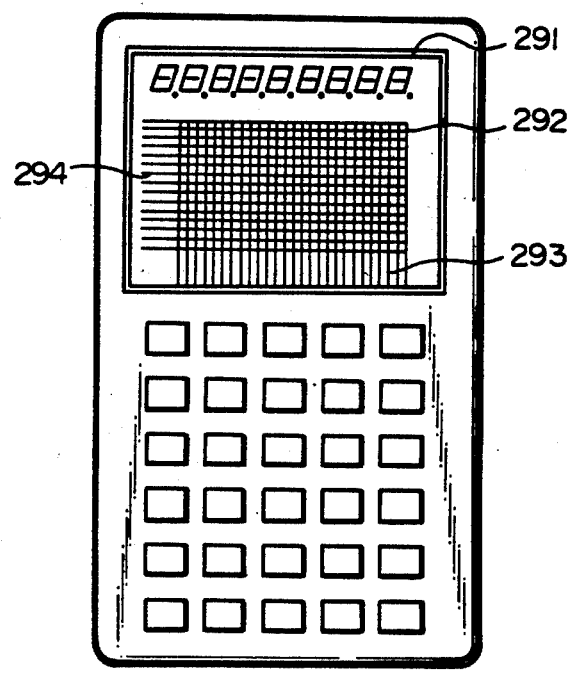
FIG. 25 shows an example of an electronic calculator incorporating an electro-optical display device adapted to be driven by a method of the present invention.

FIG. 25 illustrates an embodiment for a case in which the display device of the present invention is utilized in an electronic calculator. Here, the display device is employed so as to display on a graph the results of calculations. Reference numeral 291 denotes a liquid-crystal display sheet formed by sandwiching nematic liquid crystals between two glass plates, with two polarizing plates and a reflective back plate also being provided. Graph display portion 292 is composed of a liquid crystal material sandwiched between two glass plates, one of which is provided with longitudinally disposed transparent strip-like conductors 293 while the other is equipped with transversely disposed conductors 294 of the same type. Conductors 94 are connected to the 1st driver circuit and are applied with mutually independent drive signals. Conductors 293 are connected to the column drive circuit and are either applied with signals which are independent of each of those impressed upon conductors 294, or are applied with signals each of which is the same as a signal applied to one of the conductors 294. It is thus possible to erase a display (or induce display state) of a single display element as selected from a column of display elements in conformance to the type of signals applied to conductors 293, and a graph of any single-valued function can therefore be displayed. It also goes without saying that a double-valued function can be displayed by making use of every other longitudinal conductor 293, or that functions in excess of double-valued functions can be readily displayed by employing such means as will alternatively display a different graph every other second. The coordinate axes and the graph graduations may be printed upon the glass of the display panel, but it is also possible to make use of the liquid crystals to produce a display which is time-shared.

Figure 26A:
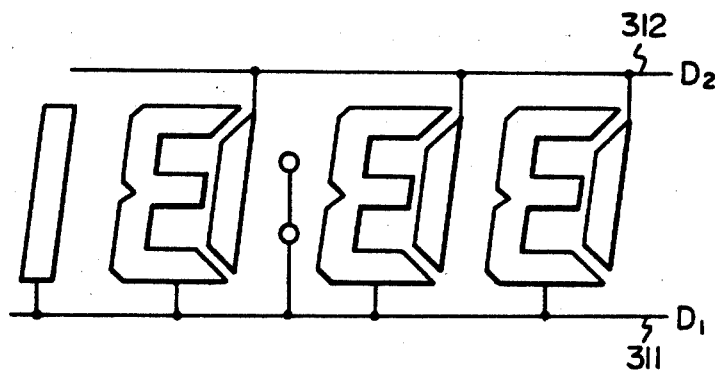
FIGS. 26A and 26B show a further example of an electrode arrangement in accordance with the present invention.
Figure 26B:
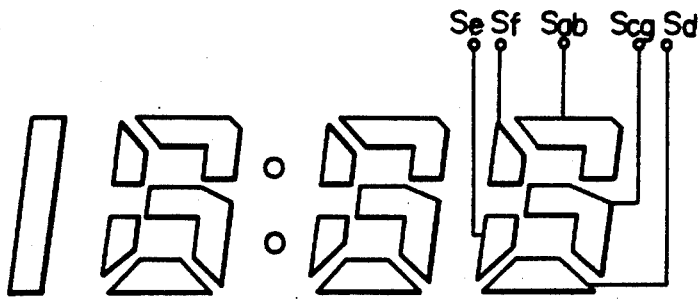

FIGS. 26A and 26B illustrates another example of a divided display element electrode pattern for a case in which driving is to be accomplished in accordance with the system of the present invention. Information indicative of hours and minutes is displayed by a 7 segment display element. FIGS. 26A and 26B show the way in which the row electrodes and column electrodes have been divided, respectively.

In FIG. 26A, line 311 is connected in common to electrodes a, d, e, f and g of FIG. 26A, and serves as a first row electrode, designated as a D1 digit, for the 10 hours digit, 1 hours digit, both minutes digits, and the seconds colon. Line 312 is commonly connected to electrodes b, c, of each digit and serves as a second row electrode, designated as a D2 digit, for one hour and both minutes digits. In FIG. 26B showing the division of the column electrodes, electrodes a, b and c, g are commonly connected, with electrodes d, e and f remaining unconnected to their neighbors and thus independent. In other words, the column electrodes consist of only 5 electrodes in number so that the number of electrodes is reduced by 2.

Figure 27:
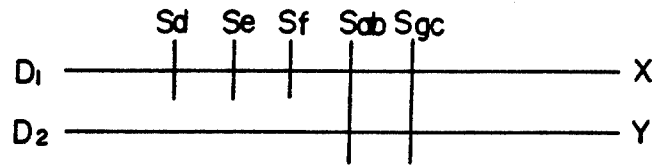
FIG. 27 is a symbolic representation of the electrode arrangement shown in FIGS. 26A and 26B.

FIG. 27 is a symbolic representation of the electrode division shown in FIG. 26 and is provided with notation to correspond to the letters of the alphabet assigned to the electrodes of FIG. 26(b). Electrodes Sab and Sgc are connected in a matrix configuration with respect to electrodes D1 and D2. When the electrodes so divided as in FIG. 26 are employed, the matrix connected electrodes enable a reduction in the total number of display electrodes in comparison to a static driving system. In other words, when static driving is performed for a display of hours and minutes as shown in FIG. 26, 23 column electrodes and one row electrode, or a total of 24 electrodes, are required. However, when the electrodes are divided as shown in FIG. 26, 17 column electrodes and two row electrodes for a total of 19 electrodes will suffice. Moreover, one pair of electrodes a and d may be commonly connected if the display is used in a timepiece because the 10-minutes digit only counts to 5 before returning to 0. In this case, the number of electrodes mentioned above can be further reduced by one. Furthermore, when two 7-segment display elements are added to allow for a seconds display as well as an hours and minutes display, the a and d electrodes of the 10-minutes digit and 10-seconds digit may both be commonly connected so that, whereas 36 electrodes would be required for a static driving system, only 27 electrodes will suffice if the electrodes are divided as shown in FIGS. 26A and 26B. For a case in which 7-segment display elements are to be added to allow for simultaneous display of months and date, only 43 electrodes will be required as opposed to a total of 58 for a static driving system. Accordingly, dividing the electrodes as shown in FIGS. 26A and 26B makes it clear that the number of necessary electrodes is approximately $\frac{3}{4}$ of that which is required for a static driving system.

In a static driving system, if a signal applied to a common electrode is expressed as X, the signals applied to the segment electrodes are of two types, namely $\overline{X}$ for display and X for non-display. For the operation of a 2-digit matrix driving system having two row electrodes obtained by dividing a common electrode into two portions, if the signals applied to the digit electrodes are expressed by X and Y, the signals applied to the column electrodes may be signals designated by $\phi 1$, $\overline{\phi 1}$, $\phi 2$, $\overline{\phi 2}$ which are completely independent of signals X and Y and which are applied in conformance to whether the cross points of the electrodes connected to the matrix are to be in a state of display or non-display.

According to the driving system of the present invention, when signals X and Y are applied to row electrodes, respective column electrodes are supplied with signals of three types, namely signals X and Y which are identical to those applied to the row electrodes, and a signal Z which is independent of signals X and Y, these signals being applied in response to whether a state of display or non-display is indicated.

Figure 28A:
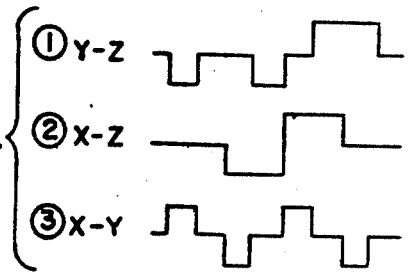

FIG. 28 shows the waveforms of drive signals which are to be applied to respective row electrodes and column electrodes according to the display driving system of the invention. FIG. 28(1) represents a clock signal $\phi$ obtained from a clock signal source and having a frequency of approximately 64 Hz. FIGS. 28(2) and 28(3) denote drive signals X and Y which are actually signal $\phi$ divided by 2. Signal X is synchronized to the rising side of signal $\phi$, and signal Y is synchronized to the falling side of the same. FIG. 28(4) designates a drive signal Z which is a drive signal X divided by 2. These three drive signals X, Y and Z are utilized to drive a liquid crystal display device, with drive signal X applied to the D1 row electrode of line 311 in FIG. 26A, and drive signal Y applied to the D2 row electrode of line 312.

The drive signals X, Y and Z are selectively applied to respective column electrodes depending on whether the display elements are to be displayed or not. As will be appreciated from FIG. 28, the drive signals X, Y and Z take two voltage potentials $V_0$ and $V_1$, and their voltages are determined by the optical saturation voltage $V_S$ of the liquid crystal display elements. If, by way of example, the optical saturation voltage $V_S$ is assumed to have an rms value of 2 volts, then signal φ will perform a driving function at a battery voltage of 1.5 volts, and the voltages at which signals X, Y and Z perform driving will be double the value of signal φ, or 3 volts.

In FIG. 28, the first and second drive signals X and Y take different voltage potentials Vo and V1 during at least one of a first group t1, t3, t5 or t7 of a plurality of equally divided time intervals of a half cycle period. For example, the first drive signal X takes a first voltage potential V1 during a first time interval t1, during which the second drive signal Y takes a second voltage potential Vo. Similarly, the first drive signal X takes the second voltage potential Vo during a third time interval t3, during which the second drive signal Y takes the first voltage potential V1. Likewise, the first and second drive signals X and Y take the first and second voltage potentials V1 and Vo, respectively, during a fifth time interval t5, and take the second and first voltage potentials Vo and V1 during a seventh time interval t7, respectively. The first and second drive signals X and Y take the same voltage potential Vo or V1 during at least one of another or second group t2, t4, t6 and t8 of the half cycle period. More specifically, the first and second drive signals X and Y take the same voltage potential of V1 during the second time interval t2, the voltage potential Vo during the fourth time interval, the voltage potential V1 during the six time interval t6, and the voltage potential Vo during the eighth time interval t8. These first and second drive signals X and Y are applied not only to the row electrodes but also to the column electrodes as previously noted, with the first drive signal X applied to a column electrode inducing the display state at a display segment on a row electrode to which the second drive signal is applied and inducing the non-display state at the display segment on the row electrode to which the same first drive signal X is applied while the second drive signal Y applied to the column electrode induces the display state at a display segment on a row electrode to which the first drive signal X is applied and induces the non-display state at the display segment on the row electrode to which the same second drive signal Y is applied. A third drive signal Z also takes the voltage potentials V1 and Vo, during the time intervals t1 to t4 and during the time intervals t5 to t8, respectively. This drive signal Z is only used as a column drive signal and applied to the column electrode, inducing the display state at all of the display segments along the column electrode across the two row electrodes. It will now be appreciated that the column drive signal inducing l display element to a display state and n-l display element to a non-display state takes a voltage potential nearly equal to a value C given by $$C = ro - A \sum_{i}^{Eon} (ri - ro)$$

$$ro = \left\{ \sum_{i}^{All} ri \right\} / n$$

$$A = \sqrt{(n-1)/(l(n-l))}$$

where ro = mean value of the voltage potentials of said row drive signals, ri = the voltage potential of the row drive signal to be applied to i-th row electrode, during a given time interval, on which display element is in the display state, n = the number of the display elements of said each column electrode, l = the number of turned on display elements along said each column electrode.

FIG. 29 shows the application of drive signals X, Y and Z to column electrodes depending upon whether they are to be brought to a state of display or non-display for a case in which the electrodes are divided as illustrated in FIGS. 26A and 26B. In FIG. 29(a), the symbol "O" will be taken as denoting display segments which are to be displayed, and the symbol x will denote those which are not. Those display segments which are included only in the D1 row electrode can be brought to state of display by the application of the third drive signal Y, while the first drive signal X is applied for a case in which elements are not to be raised to a displayed state. Next, with regard to the D1 row electrode, D2 row electrode and the display matrix connected elements, it is sufficient to apply the third drive signal Z to both elements at cross-points of the matrix for a case in which the display elements are to be displayed. Further, when an element at only one cross point of the matrix is to be displayed and the other not displayed, the second drive signal Y may be applied to the column for diplaying its display elements, and the first drive signal X may be applied to the column for displaying its display elements.

Signals X and Y correspond to the signals X2' and X3' in the embodiment shown in FIG. 19 and FIG. 20. Signal Z corresponds to signal X4'. Signals X, Y and Z are mutually independent. When signal Z is applied as a segment signal, the potential difference applied to the display element at the intersection with D1 is (X−Z), i.e. as shown in FIG. 28B(1). The voltage applied to the display element at the intersection with D2 is (Y−Z), i.e. as shown in FIG. 28B(2). Both of these types of display element will be set ON. When Y is applied as a segment signal, then the voltage applied across the display element at the intersection with D1 is (X−Y), shown in FIG. 28B(3). This elements will be set ON. The voltage applied to the display element at the intersection with D2 will be (Y−Y)=0, so that this display element will be OFF. When X is applied as a segment signal, then the voltage applied across the display element at the intersection with D1 will be (Y−X), as shown in FIG. 28B(3), so that this display element will be OFF. The voltage applied across the display element at the intersection with D2 will be (X−X)=0, so that this display element will be OFF.

FIG. 29(b) illustrates the signals which are applied to respective column electrodes Sd, Se, Sf, Sab and Scg for an electrode divided as shown in FIGS. 26A and 26B. Here, numbers from 0 to 9 are displayed by means of 7 segments which are driven in accordance with the above mentioned conditions of display or non-display. By way of example, when the number 5 is to be displayed, FIG. 29(b) indicates that signal Y is applied to electrode Sd and signal X to electrode Se. As may be appreciated from the drawing, none of the cross-points of the matrix connected electrodes will assume a state of non-display.

FIG. 30 illustrates numbers from 0 to 9 formed by 7 display segments. It can thus be appreciated that the electrodes were divided as shown in FIGS. 26A and 26B from the fact that the matrix connected segments ab and cg are never both in a non-display state.

When the waveforms depicted in FIG. 28 are applied to the display electrodes of a liquid crystal display device, the effective voltage applied to display elements set in the ON state will be $\sqrt{\frac{3}{2}}V$ rms, while that applied to display elements situated at the cross-points of the matrix and set in the OFF state will be 0V. Here, V is the voltage of signals X, Y and Z. For example, if a 1.5 volts battery is employed and signals X, Y and Z possess a voltage of 3 volts or twice that of the battery, display elements for display will be displayed at a voltage of 2.1 Vrms.

Figure 31:
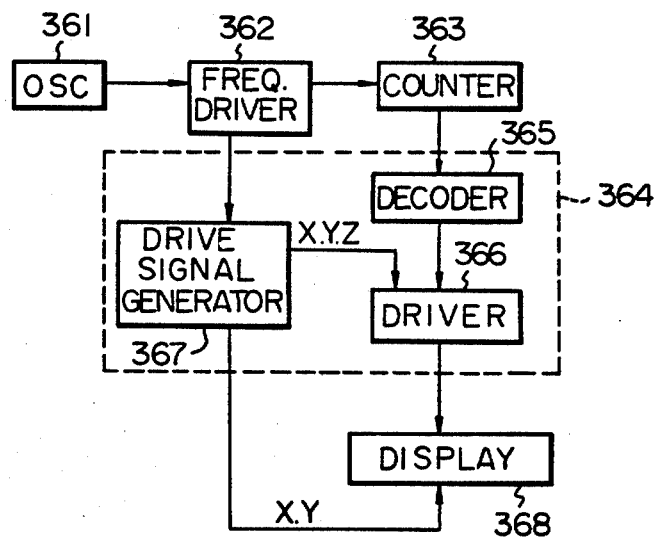
FIG. 31 is a block diagram of an electronic timepiece incorporating a liquid crystal display device adapted to be driven by a driving method of the present invention.

FIG. 31 illustrates a block diagram for an electronic timepiece incorporating a liquid crystal display device driven by a driving method of the invention. Reference numeral 361 denotes an oscillator, 362 a frequency divider, and 363 hours, minutes and seconds counters for keeping time. Reference numeral 365 designates a decoder, 366 a driver, 367 a block for producing the driving signals shown in FIG. 28, and 368 a liquid crystal display device.

Figure 32:
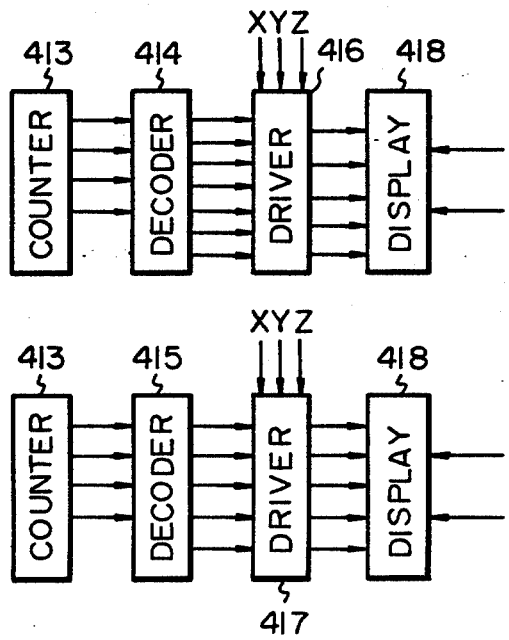
FIG. 32 shows a block diagram of a decoder and a driver circuit for the timepiece shown in FIG. 31.

FIG. 32 shows the decoder and driver circuits for the timepiece. Reference numeral 413 denotes the counters for hours, minutes, seconds and the like. If counter 413 is composed of a divider-by-ten counter then it is capable of producing output signals A, B, C and D having a weight of $2^0$, $2^1$, $2^2$ and $2^3$. Decoder 414 is a 7-segment decoder and possesses the same construction as the decoder used in a conventional static driving system. Reference numeral 416 is a driver for a 7-segment output and, in acting on signals X, Y, Z, produces five segment output signals. Decoder 415 directly decodes the counter output signals for five segments, and 5-segment driver 417 acts on signals X, Y, Z in a manner similar to driver 416. Reference numeral 418 denotes a liquid crystal display device. In the present embodiment, information related to numbers from 0 to 9 is to be displayed so that five column electrodes and 2 row electrodes are required. The decoder to be used will be decided by the specifications of the timepiece. Hereinafter, the constitutions of the decoder and driver to be described are based upon the electrodes divided as shown in FIG. 26.

Figure 33:
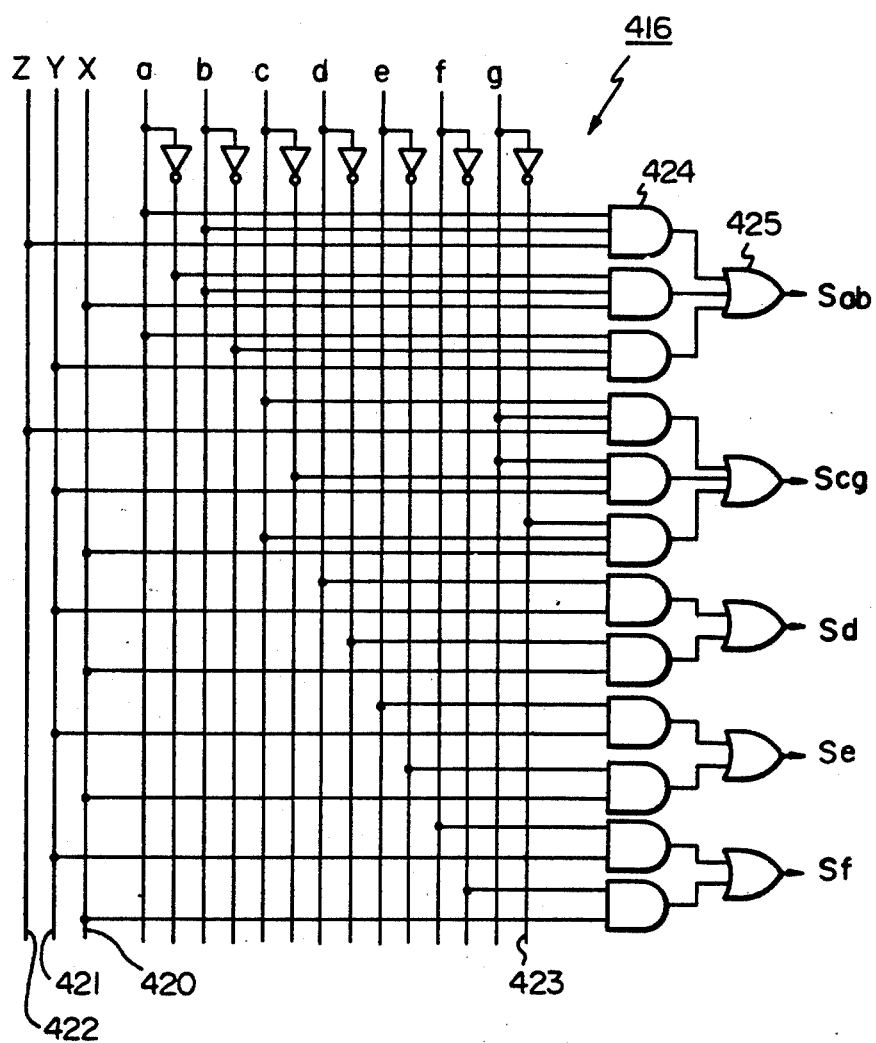
FIG. 33 is a detail circuitry for the driver shown in FIG. 32.

FIG. 33 depicts the construction of driver 416. This is an example of a driver used for a display according to which seconds and minutes or the like are displayed in terms of numbers from 0 to 9. The driver performs operations on a, $\bar{a}$, b, $\bar{b}$ ... g, $\bar{g}$ output signals produced by the conventional 7-segment decoder and on signals X, Y, Z and provides Sab, Scg, Sd, Se and Sf column output signals. Lines 420, 421, 422 represent the lines to which signals X, Y, Z are applied, and line 423 delivers the $\bar{g}$ segment output from decoder 414. Reference numeral 424 denotes an AND gate, and 425 an OR gate. The following relation will hold with regard to the Sf segment electrode: $Sf = fY + \bar{f}X$; in other words, when the decoder output signal f is at an H logic level, signal Y appears as an output, whereas signal X will be the output signal when the decoder output signal is at an L logic level. The same will hold true for the Sd and Se segment electrodes. With regard to the Sab segment electrode $Sab = abZ + \bar{a}bX + a\bar{b}Y$; thus, signal Z appears as the output when the a and b segments are both at an H logic level, signal X appears as the output when the a segment is at an L level and the b segment at an H logic level, and signal Y will appear as an input signal at the Sab electrode when the a segment is at H level and the b segment at an L logic level. The same will hold true for the Scg electrode.

It may thus be understood that driver 416 as described above makes use of a decoder having the same constitution as decoders employed in conventional static driving systems.

Figure 34:
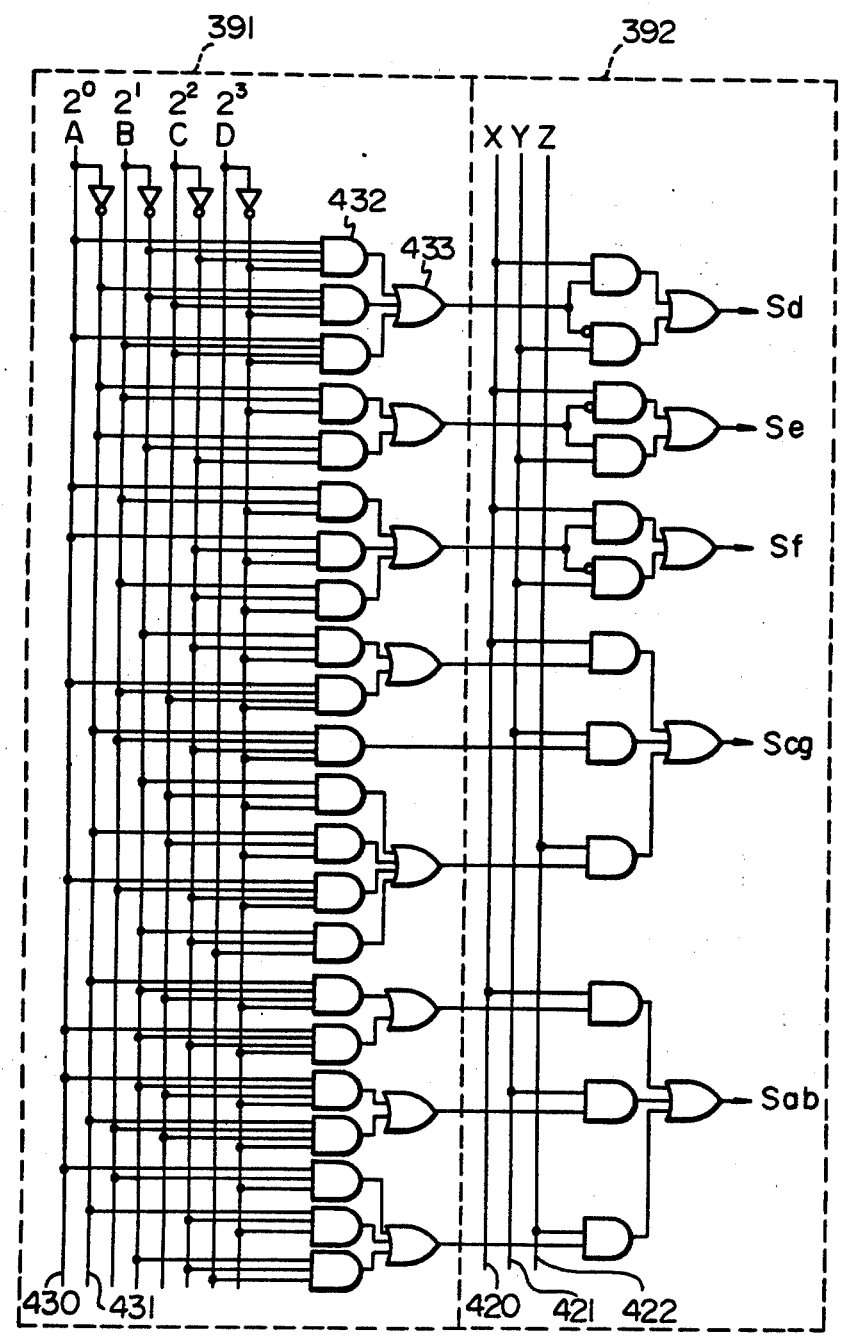
FIG. 34 is a detail circuitry for a second decoder and driver circuit shown in FIG. 32.

FIG. 34 illustrates a 2nd decoder and driver circuit in accordance with the invention. Block 391 represents the decoder section and block 392 the driver section. This embodiment, as in that of FIG. 33, is also adapted to display digits from 0 to 9, and, if a correspondance is made to the constitution of FIG. 32, decoder 415 is represented by block 391 of FIG. 34, and the constitution of driver 417 is given by block 392 of FIG. 34.

Lines 430 and 431 in FIG. 34 deliver the output signals from the counters, which signals are represented by A, B, C and D possessing a weight of $2^0$, $2^1$, $2^2$ and $2^3$, respectively. Reference numeral 432 denotes an AND gate and 433 an OR gate. An example will now be given in which an output signal from the decoder is applied to the input side of the Se electrode. From the truth table of FIG. 29(b), $X = A\bar{D} + \overline{ABC} + \overline{BC}D$ and $Y = \overline{AB}\bar{D} + \overline{ABC}$. In other words, if the output signals from the counter conform to these relationships, signals X and Y will be applied to the input side of the Se electrode. In the case of the Se electrode, the decoder output is $\overline{AB}\bar{D} + \overline{ABC} = P$. This decoder output signal is applied to the driver circuit represented by block 92. The logic for the driver circuit is given by $X \cdot \bar{P} + Y \cdot P$. The signal Y will be applied to the Se electrode when the decoder output P is at an H logic level, and the signal X will be applied when the output P is at an L logic level, with the Y signal indicative of a display state and the X signal indicative of a non-display state.

For a description of the Sab electrode, the truth table of FIG. 29(b) is employed as was previously the case:

$$X = \bar{A}\bar{B}C\bar{D} + A\bar{B}\bar{C}D$$

$$Y = A\bar{B}C\bar{D} + \bar{A}BC\bar{D}$$

$$Z = AB\bar{D} + \bar{A}\bar{C}\bar{D} + \bar{B}\bar{C}D$$

are the logic relations. The right sides of the above relations are formed by the AND, OR gates in decoder 391, and driver 392, depending on whether the decode signals are indicative of a state of display or non-display, decides which of the signals X, Y and Z are to be applied as inputs to display electrode Sab.

The decoder and driver circuits shown in FIGS. 33 and 34 differ in structure depending upon the specifications of the segment electrode arrangement with respect to the digit electrodes; thus, a number of circuit variations can be made and the circuits cited in the present example are not the only possibilities. In addition, the signals applied to the display electrodes are not limited to those having the wave forms shown in FIG. 28.

Figure 35:
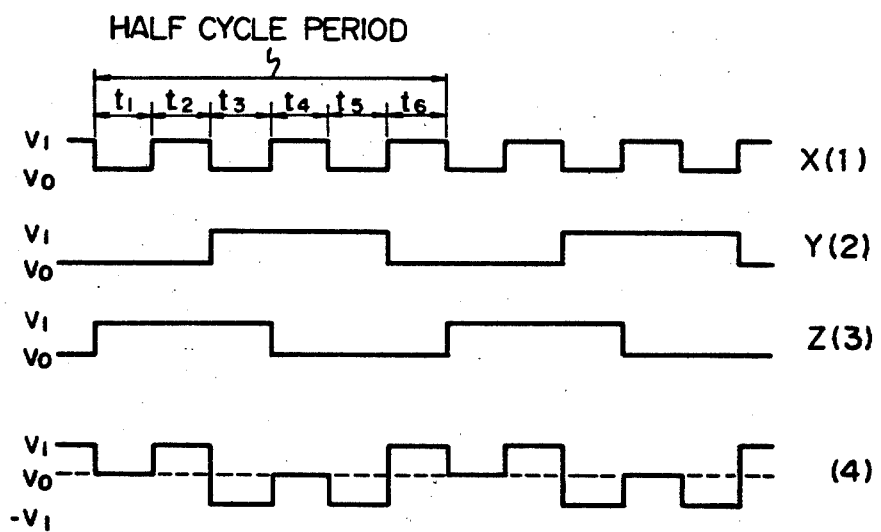
FIG. 35 is a waveform diagram for a modified example of drive signals shown in FIG. 28.

FIG. 35 illustrates a modification of display drive signals. In FIG. 35, first, second and third drive signals X, Y and Z take first and second voltage potentials V1 and Vo. During the first time interval t1 of the half cycle period, the first and second drive signals X and Y take the same voltage potential of Vo. During the second time interval t2 of the half cycle period, the first drive signal X take the voltage potential V1, and the second drive signal Y take the voltage potential Vo different from that of the first drive signal X during the same time interval t2. Similarly, the first and second drive signals X and Y take the different voltage potentials Vo and V1 during the third time interval t3 of the half cycle period. Likewise, the first and second drive signals X and Y take the different voltage potentials during the fifth and six time intervals t5 and t6, and take the same voltage potential during the time interval t4. A third drive signal Z takes the voltage potential V1 during the time intervals t1 to t3 and the voltage potential Vo during the time intervals t4 to t6. FIGS. 35(1), (2) and (3) represent signals X, Y and Z. In this case, the same relations hold as was the case with respect to the conditions of FIG. 29. If the drive signals depicted in the present example are employed, elements which are to be brought to a state of display are applied with voltage waveform typically represented by FIG. 35(4). The effective voltage impressed upon the display elements in this case is $\sqrt{\frac{2}{3}}$ Vrms; if the battery voltage is 3 volts, then the rms voltage will be 2.45 volts. Elements which are not to be displayed are applied with a voltage of 0.

Figure 36:
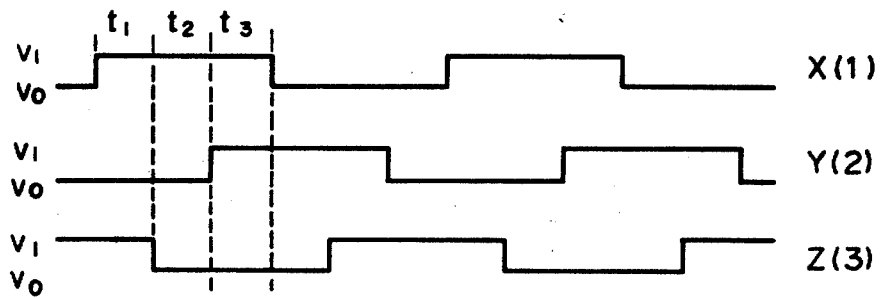
FIG. 36 is another modification of waveforms for the drive signals shown in FIG. 28.

FIG. 36 depicts another modification of waveforms with which driving can be accomplished. FIGS. 36(1), (2) and (3) denote first, second and third drive signals X, Y and Z, respectively, all of them having the same frequency. During at least one time interval t3, the first and second drive signals X and Y take the same voltage potential V1. During the other time intervals t1 and t2 of the half cycle period, the first drive signal X take the voltage potential V1 and the second drive signal Y take the voltage potential Vo different from the first drive signal X. The third drive signal Z take the voltage potential V1 during the first time interval t1, and take the voltage potential Vo during the other time intervals t2 and t3. If the phase relation shown is employed, there will be an interval over which a voltage of 0 is present across the electrodes of the display elements to be displayed during a portion of the interim in which the direction of the applied voltage is reversed. Therefore, the electricity charged at this time in the capacitance between electrodes flows through a discharge path without passing through the power source, enabling unnecessary power consumption to be avoided.

The voltage relations among signals X, Y, Z according to the present driving system are as follows. If the average voltage of signals X, Y, Z with respect to time is stated in terms of a reference voltage, (1) an interval is present during which the waveform of the X and Y signal voltage is different in sign;

(2) it is preferable that this interval have an overall value greater than or equal to $\frac{1}{4}$ but less than or equal to $\frac{3}{4}$ ($\frac{2}{3}$ is the most desirable);

(3) during this interval, Z has the same sign as X and Y but the remainder of the waveform is different in sign;

(4) in (3) above, the interval during which Z has the same sign as X and Y, and the interval during which Z is different in sign from X and Y are each preferably one-half of the interval stated in (3);

(5) an interval is present during which the X and Y signal voltages differ in sign;

(6) during a portion of the interval stated in (5), Z has the same sign as X but differs in sign during the other portion of the interval;

(7) in (6) above, the interval during which X and Z share the same sign is preferable one-half of the respective intervals stated in (6);

(8) the effective voltages of $(X-Y)$, $(X-Z)$, and $(Y-Z)$ are approximately equal; and (9) it is permissible for X, Y and Z to attain a plurality of voltage levels although the circuitry can be more simply constructed if only two voltage levels are adopted as shown in the drawings.

Figure 37:
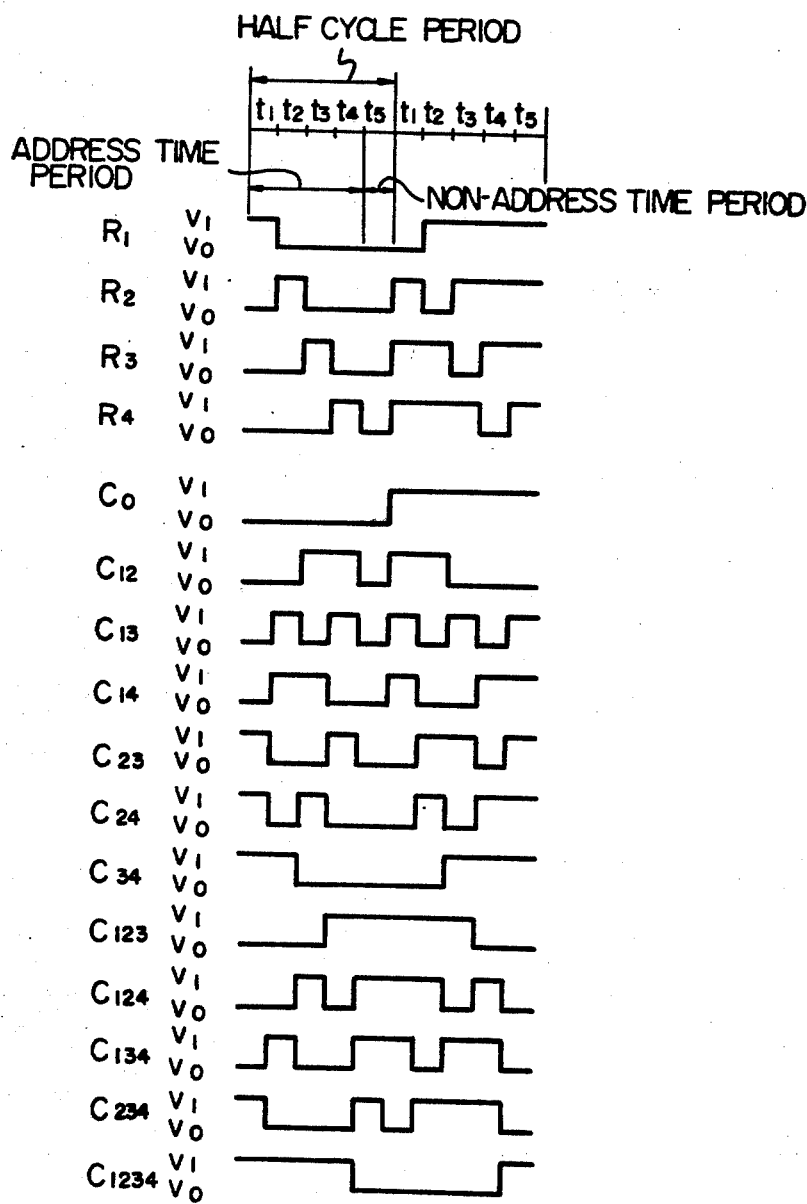
FIG. 37 is a waveform diagram for another example of drive signals to be applied to a display device having four row electrodes and associated column electrodes arranged in a matrix configuration to perform a method of the present invention.

FIG. 37 shows the waveform diagram for row and column drive signals applied to a display device arranged in a matrix configuration using four row electrodes. In FIG. 37, R1 through R4 denote row drive signals to be applied to first through fourth row electrodes, respectively. Co designates a column drive signal to induce display elements on all the row electrodes to a state of non-display. C12, C13, C14, C23, C24, C34 denote column drive signals to induce display elements on two row electrodes to a state of non-display. C123, C134, C234 denote column drive signals to induce a display element on one of row electrodes to a state of non-display. C1234 denotes a column drive signal to induce display elements on all the row electrodes to a state of display. The suffix 1, 2, 3 and 4 applied to the character "C" indicate the number of row electrodes whose display elements are to be displayed.

A half frame time T includes an address time period composed of time intervals t1, t2, t3 and t4, and a non-address time period composed of a time interval t5. The row drive signals and the column drive signals have two voltage potentials Vo and V1. During the time interval t1, the first row drive signal r1 takes a second voltage potential V1 while the other row drive signals r2 to r4 take a first voltage potential Vo. During the time interval t2, the second row drive signal r2 takes the second voltage potential V1 while the other row drive signals r1, r3 and r4 take the first voltage potential. During the third time interval t3, the third row drive signal r3 takes the second voltage potential V1 while the other row drive signals take r1, r2 and r4 take the first voltage potential Vo. During the fourth time interval t4, the fourth row drive signal r4 takes the second voltage potential V1 while the other row drive signals r1 to r3 take the first voltage potential Vo. During the time interval t5 corresponding to the non-address time period, all of the row drive signals r1 to r4 take the same voltage potential at Vo. The column drive signal Co takes the first voltage potential Vo during all the time interval t1 to t5 of the half frame time. Namely, the column drive signal Co takes the same voltage potential as those of three row drive signals during each of the time intervals t1 to t5. The column drive signal $C_{ij}$ inducing the display state at the display elements on the i-th row electrode and j-th row electrode takes the same voltage potential as those of the three row drive signals during the time intervals $t_i$ and $t_j$, takes the voltage potential different from those of the row drive signals $r_i$ and $r_j$ during those of the time intervals t1 to t4 except the time intervals $t_i$ and $t_j$, and takes the same voltage potential as those of all of the row drive signals r1 to r4 during the time interval t5. The column drive signal $C_{ijk}$ inducing the display state at the display elements on the i-th, j-th and k-th row electrodes takes the same voltage potential as those of the three row drive signals during the time intervals $t_i$, $t_j$ and $t_k$, takes the voltage potential different from those of the row drive signals $r_i$, $r_j$ and $r_k$ during those of the time intervals t1 to t4 except the time intervals $t_i$, $t_j$ and $t_k$, and takes the voltage potential different from those of the row drive signals r1 to r4 during the time interval t5. The column drive signal C1234 takes the same voltage potential as those of the row drive signals r1, r2, r3 and r4 during the time intervals t1, t2, t3 and t4, respectively, and takes the same voltage potential as those of four row drive signals r1 to r4 during the time interval t5. It will be seen that during the address time period one of the row electrodes has the potential level different from those of the remaining row electrodes during each of the time intervals. Therefore, r2=r3=r4≠r1 during time interval t1; r1=r3=r4≠r2 during time interval t2; r1=r2=r4≠r3 during time interval t3; and r1=r2=r3≠r4 during time interval t4.

To induce the display elements of all the row electrodes to be in a state of non-display, the column electrode is applied with a voltage potential as shown by the column drive signal Co. Therefore, Co=r2=r3=r4 during time interval t1; Co=r1=r3=r4 during time interval t2; Co=r1=r2=r4 during time interval t3; Co=r1=r2=r3 during time interval t4; Co=r1=r2=r3=r4 during time interval t5.

In order to induce the display elements of two row electrodes to be in the non-display state, the column electrode is applied with a voltage potential equal to those applied to the non-display row electrodes during the time intervals when they are addressed, applied with a voltage potential different from those applied to the display row electrodes during the time intervals when they are addressed, and applied with the same voltage potential as those of all the row electrodes during the non-address time interval. For example, the column drive signal C12 has the voltage potential "0" equal to those of the row drive signals r3 and r4 during the time intervals Ta1 and Ta2 during which time the non-display row electrodes r3 and r4 are addressed, i.e., C12=r3=r4. However, during the time intervals t1 and t2 during which time the display row electrodes r1 and r2 are addressed, the column drive signal has the voltage potential different from those of the row drive signals r1 and r2, i.e., C12≠r1 and C12≠r2. During the time interval t5, C12=r1=r2=r3=r4. With these driving waveforms applied to the row and column electrodes, the root mean square value of the drive signal applied to the display element is $\sqrt{3/5}$ V in the display state and $\sqrt{1/5}$ V in the non-display state. In this case, the operation margin is $\sqrt{3}$. It should be noted that the principal concept of forming the row and column drive signals may be applied to a case in which the display device has more than five row electrodes arranged in a matrix configuration.

What is claimed is:

1. A method of cyclically driving an electrooptical display device including row and column and electrodes arranged in a matrix array to provide display elements at intersections between said row and column electrodes, comprising the steps of:

applying row drive signals to said row electrodes, respectively, during a half cycle period equally divided into prescribed time intervals, each of said row drive signals taking a plurality voltage potentials during said half cycle period and one of said row drive signals taking a voltage potential different from those of the other of said row drive signals during more than one of said prescribed time intervals; and applying first, second and third column drive signals to each of said column electrodes during said half cycle period, with said first column drive signal inducing a non-display state at the display elements along said each column electrode, and said second column electrode inducing a non-display state at the display element along said each column electrode across one of said row electrodes and inducing a display state at the display elements along said each column electrode across the other of said row electrodes, wherein said first column drive signal takes a reference voltage potential equal to the mean value of the voltage potentials of said row drive signals during the prescribed time intervals of said half cycle period, and said second column drive signal takes a voltage potential nearly equal to a value C given by $$C = ro - A \sum_{i}^{Eqn} (ri - ro)$$

$$ro = \left\{ \sum_{i}^{All} ri \right\} / n$$

$$A = 2/(n - l)$$

where
ro = the mean value of the voltage potentials of said row drive signals,
ri = the voltage potential of the row drive signal to be applied to i-th row electrode, during a given time interval, on which display element is in the display state,
n = the number of the display elements of said each column electrode,
l = the number of turned on display elements along said each column electrode.

2. A method of cyclically driving an electrooptical display device including row and column electrodes arranged in a matrix array to provide display elements at intersections between said row and column electrodes, comprising the steps of:

applying row drive signals to said row electrodes, respectively, during a half cycle period equally divided into prescribed time intervals, each of said row drive signals taking a plurality voltage potentials during said half cycle period and one of said row drivr signals taking a voltage potential different from those of the other of said row drive signals during more than one of said prescribed time intervals; and applying first, second and third column drive signals to each of said column electrodes during said half cycle period, with said first column drive signal inducing a non-display state at the display elements along said each column electrode, and said second column electrode inducing a non-display state at the display element along said each column electrode across one of said row electrodes and inducing a display state at the display elements along said each column electrode across the other of said row electrodes, wherein said first column drive signal takes a reference voltage potential equal to the mean value of the voltage potentials of said row drive signals during the prescribed time intervals of said half cycle period, and said second column drive signal takes a voltage potential nearly equal to a value C given $$C = ro - A \sum_{i}^{Eon} (ri - ro)$$

$$ro = \left( \sum_{i}^{All} ri \right) / n$$

$$A = \sqrt{(n-1)/(l(n-l))}$$

where
- ro = mean value of the voltage potentials of said row drive signals,
- ri = the voltage potential of the row drive signal to be applied to i-th row electrode, during a given time interval, on which display element is in the display state,
- n = the number of the display elements of said each column electrode,
- l = the number of turned on display elements along said each column electrode.

3. A method of cyclically driving an electrooptical display device having a matrix array of first, second and third row electrodes and first, second and third column electrodes, wherein said first and second column electrodes intersect with said first, second and third row electrodes to provide a plurality of display elements at intersections between said first, second and third row electrodes and said first and second column electrodes, and said third column electrode intersects with a single one of said first, second and third row electrodes to provide a display element at an intersection between said third column electrode and said single one of said row electrodes, comprising the steps of:

applying first, second and third row drive signals to said first, second and third row electrodes, respectively; and applying one of first, second and third column drive signals to each of said first, second and third column electrodes, with said first column drive signal inducing a non-display state at all of the display elements along each column electrode, said second column drive signal inducing a non-display state at a single display element along said each column electrode and inducing a display state at the other two display elements along said each column electrode, and said third column drive signal inducing a display state at all of the display elements along said each column electrode;

wherein each of said first, second and third row drive signals takes three values of first, second and third voltage potentials during a half cycle period divided into prescribed time intervals, and one of said first, second and third row drive signals takes one of said voltage potentials different from those of the other of said row drive signals during each of said prescribed time intervals; and wherein said first column drive signal takes a reference voltage potential equal to the mean value of said first, second and third voltage potentials of said row drive signals during said prescribed time intervals of said half cycle period, said second column drive signal takes a fourth voltage potential during one of said prescribed time interval, said reference voltage potential during another one of said prescribed time intervals, and a fifth voltage potential during another one of said prescribed time intervals, and said third column drive signal takes the fourth and fifth voltage potentials during each of said prescribed time intervals.

4. A method of cyclically driving an electrooptical display device having a matrix array of first, second and third row electrodes and first, second and third column electrodes, wherein said first and second column electrodes intersect with said first, second and third row electrodes to provide a plurality of display elements at intersections between said first, second and third row electrodes, and said first and second column electrodes, and said third column electrode intersects with a single one of said first, second and third row electrodes to provide a display element at an intersection between said third column electrode and said single one of said row electrodes, comprising the steps of:

applying first, second and third row drive signals to said first, second and third row electrodes, respectively; and applying one of first, second and third column drive signals to each of first, second and third column electrodes, with said first column drive signal inducing a non-display state at all of the display elements along each column electrode, said second column drive signal inducing a non-display state at the display element along said each column electrode and inducing a display state at the other two display elements along said each column electrode, and said third column drive signal inducing a display state at all of the display elements along said each column electrode;

wherein each of said row drive signals takes first and second voltage potentials during a half cycle period divided into first, second and third prescribed time intervals, and said first, second and third row drive signals take the first voltage potential during said first, second and third prescribed time intervals, respectively, and take the second voltage potential during the remaining prescribed time intervals; and wherein said first column drive signal takes a reference potential equal to said second voltage potential during all of the prescribed time intervals of said half cycle period, said second column drive signal takes a third voltage potential higher in level than said first voltage potential lower in level than said first voltage potential during one of said first, second and third prescribed time intervals and the second voltage potential during the other prescribed time intervals, and said third column drive signal take the second and third voltage potentials during each of the prescribed time intervals.

5. A method of cyclically driving a liquid crystal display device having a matrix array of first and second row electrodes and first to fifth column electrodes, wherein said first and second column electrodes intersect with said first and second row electrodes to provide display elements at intersections between said first and second row electrodes and said first and second column electrodes, and said third, fourth and fifth column electrodes intersects with a single one of said first and second row electrodes to provide a display element at each of intersections between said third to fifth column electrodes and said single one of said row electrodes, comprising the steps of:

applying first and second drive signals to said first and second row electrodes, respectively during a half cycle period equally divided into a plurality of prescribed time intervals; and applying one of said first and second drive signals, and a third drive signal to each of said first and second column electrode during said half cycle period, and applying one of said first and second drive signals to each of said third to fifth column electrode during said half cycle period, with said first drive signal applied to each column electrode inducing a non-display state at the display element along said each column electrode across said first row electrode and a display state at the display element along said each column electrode across said second row electrode, said second drive signal applied to said each column electrode inducing a non-display state at the display element along said each column electrode across said second row electrode and a display state at the other display element along said each column electrode across said first row electrode, and said third drive signal inducing a display state at all of the display elements along said each column electrode;

wherein said first, second and third drive signals take first and second voltage potentials during said half cycle period, with one of said first and second drive signals taking a voltage potential different from that of the other of said first and second drive signal suring at least one of said plurality of prescribed time intervals while taking the same voltage potential as that of the other of said first and second drive signals during at least another one of said plurality of prescribed time intervals, and said third drive signal taking one of said first and second voltage potentials during a half of said plurality of prescribed time intervals and taking another one of said first and second voltage potentials during another half of said plurality of prescribed time intervals.

* * * * *